(12) United States Patent
Castellanos Zamora et al.

(10) Patent No.: US 12,150,208 B2
(45) Date of Patent: Nov. 19, 2024

(54) GROUP DATA MANAGEMENT IN 5G CORE NETWORK (5GC)

(71) Applicant: Telefonaktiebolaget LM Ericsson (publ), Stockholm (SE)

(72) Inventors: David Castellanos Zamora, Madrid (ES); Emiliano Merino Vazquez, Madrid (ES); Miguel Angel Garcia Martin, Pozuelo de Alarcon (ES); Maria Belen Pancorbo Marcos, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 289 days.

(21) Appl. No.: 17/431,333

(22) PCT Filed: Dec. 20, 2019

(86) PCT No.: PCT/EP2019/086812
§ 371 (c)(1),
(2) Date: Aug. 16, 2021

(87) PCT Pub. No.: WO2020/169242
PCT Pub. Date: Aug. 27, 2020

(65) Prior Publication Data
US 2022/0141647 A1    May 5, 2022

(30) Foreign Application Priority Data

Feb. 22, 2019 (EP) .................................... 19382134

(51) Int. Cl.
H04W 8/18       (2009.01)
(52) U.S. Cl.
CPC ................... H04W 8/186 (2013.01)

(58) Field of Classification Search
CPC ................. H04W 8/186; H04W 8/04
See application file for complete search history.

(56) References Cited

U.S. PATENT DOCUMENTS

2013/0051231 A1    2/2013   Cai et al.
2016/0344587 A1    11/2016  Hoffmann
(Continued)

FOREIGN PATENT DOCUMENTS

| CN | 101938705 A | 5/2011 |
|---|---|---|
| CN | 109286908 A | 1/2019 |
| WO | 2011000315 A1 | 1/2011 |

OTHER PUBLICATIONS

Japanese Office Action and English Summary dated Oct. 17, 2022 for Application No. 2021-544923, consisting of 5 pages.
(Continued)

*Primary Examiner* — Barry W Taylor
(74) *Attorney, Agent, or Firm* — Weisberg I.P. Law, P.A.

(57) ABSTRACT

Exemplary embodiments include a method for provisioning subscription data, for a plurality of subscribers, to one or more network functions, NFs, in a communication network. Such embodiments include storing group data, related to the plurality of subscribers, in association with at least a first group identifier, GID, but not in association with individual subscription data for the respective subscribers. Such embodiments also include sending, to the one or more NFs, the group data and the first GID. Such embodiments also include sending, to a particular one of the NFs, the first GID and individual subscription data for a particular one of the subscribers. Embodiments also include complementary methods performed by network functions that receive subscription data in this manner, as well as various network functions and/or nodes, in a communication network, that are configured to perform various disclosed methods.

20 Claims, 17 Drawing Sheets

(56) References Cited

U.S. PATENT DOCUMENTS

| | | | |
|---|---|---|---|
| 2018/0352050 | A1 | 12/2018 | Li et al. |
| 2019/0191467 | A1* | 6/2019 | Dao ..................... H04W 76/11 |
| 2019/0261260 | A1* | 8/2019 | Dao ................. H04W 36/0009 |
| 2020/0228936 | A1* | 7/2020 | Talebi Fard .......... H04W 8/186 |
| 2020/0404481 | A1* | 12/2020 | Zong ....................... H04L 65/40 |
| 2021/0258797 | A1* | 8/2021 | Chandramouli ...... H04L 9/3242 |
| 2022/0021642 | A1* | 1/2022 | Wang ...................... H04W 8/10 |
| 2022/0070702 | A1* | 3/2022 | Puente Pestaña ..... H04L 43/065 |
| 2023/0109782 | A1* | 4/2023 | Hietalahti ............... H04W 8/18 709/220 |
| 2023/0217241 | A1* | 7/2023 | Velev ..................... H04W 8/20 455/414.1 |

OTHER PUBLICATIONS

3GPP TSG-SA WG2 Meeting # 130 S2-1901209; Title: 5GLAN group management procedures; Source to WG: Huawei, HiSilicon; Source to TSG: SA2; Location and Date: Kochi, India; Jan. 21-25, 2019, consisting of 12 pages.

International Search Report and Written Opinion dated Mar. 31, 2020 for International Application No. PCT/EP2019/086812 filed Dec. 20, 2019, consisting of 17-pages.

3GPP TS 23.501 V15.4.0; 3rd Generation Partnership Project; Technical Specification Group Services and System Aspects; System Architecture for the 5G System; Stage 2 (Release 15), Dec. 2018, consisting of 236-pages.

3GPP TS 23.502 V15.4.1; 3rd Generation Partnership Project; Technical Specification Group Services and System Aspects; Procedures for the 5G System; Stage 2 (Release 15), Jan. 2019, consisting of 347-pages.

3GPP TS 23.288 V0.1.0; 3rd Generation Partnership Project; Technical Specification Group Services and System Aspects; Architecture enhancements for 5G System (5GS) to support network data analytics services; (Release 16), Feb. 2019, consisting of 40-pages.

3GPP TS 23.501 V16.0.2; 3rd Generation Partnership Project; Technical Specification Group Services and System Aspects; System Architecture for the 5G System; Stage 2 (Release 16), Apr. 2019, consisting of 317-pages.

3GPP TS 23.502 V16.0.2; 3rd Generation Partnership Project; Technical Specification Group Services and System Aspects; Procedures for the 5G System; Stage 2 (Release 16), Apr. 2019, consisting of 419-pages.

3GPP TS 23.288 V0.3.0; 3rd Generation Partnership Project; Technical Specification Group Services and System Aspects; Architecture enhancements for 5G System (5GS) to support network data analytics services; (Release 16), Mar. 2019, consisting of 44-pages.

SA WG2 Meeting #123 S2-178170 (Revision of S2-177963) (Revision of S2-177626) (Revision of S2-177515); Title: TS 23.502: Provide the UE Information by External Party via NEF; Agenda Item: 6.5.11; Source: Huawei, HiSilicon, Nokia, Nokia Shanghai Bell, Sony; Wok Item/Release: 5GS_Ph1/Rel-15; Document for: Approval; Date and Location: Oct. 23-27, 2017, Ljubljana, Slovenia, consisting of 4-pages.

3GPP TSG-SA WG2 Meeting #130 S2-181xxxx; Title: 5GLAN group management; Source to WG: Huawei, HiSilicon; Source to TSG: SA2; Work Item Code: Vertical_LAN; Date and Location: Jan. 21-25, 2019, Kochi, India, consisting of 12-pages.

3GPP TSG-SA WG2 Meeting #125 S2-181355; Title: TS 23.502: Clarification on the services for External Parameter Provisioning; Source to WG: Huawei, HiSilicon; Source to TSG: SA2; Work Item Code: 5GS_Ph1; Date and Location: Jan. 22-26, 2018, Gothenburg, Sweden, consisting of 4-pages.

3GPP TS 24.301 V15.5.0; 3rd Generation Partnership Project; Technical Specification Group Core Network and Terminals; Non-Access-Stratum (NAS) protocol for Evolved Packet System (EPS); Stage 3 (Release 15), Dec. 2018, consisting of 536-pages.

3GPP TS 33.401 V15.6.0; 3rd Generation Partnership Project; Technical Specification Group Services and System Aspects; 3GPP System Architecture Evolution (SAE); Security architecture (Release 15), Dec. 2018, consisting of 163-pages.

Chinese Office Action and English Summary dated Oct. 25, 2023 for Application No. 201980092713.6, consisting of 15 pages.

3GPP TSG-SA WG2 Meeting #131 S2-1901569; Title: Update to Expected UE behaviour related network data analytics; Source: Ericsson; Document for: Approval; Agenda Item: 6.11; Date and Location: Feb. 25-Mar. 1 Santa Cruz, Tenerife, Spain, consisting of 4 pages.

3GPP TSG-SA WG2 Meeting #131 S2-1901893; Title: Procedure update for expected UE behavioural parameters provisioning; Source: China Mobile; Document for: Approval; Agenda Item: 6.11; Date and Location : Feb. 25-Mar. 1, 2019, Tenerife, Spain, consisting of 4 pages.

* cited by examiner

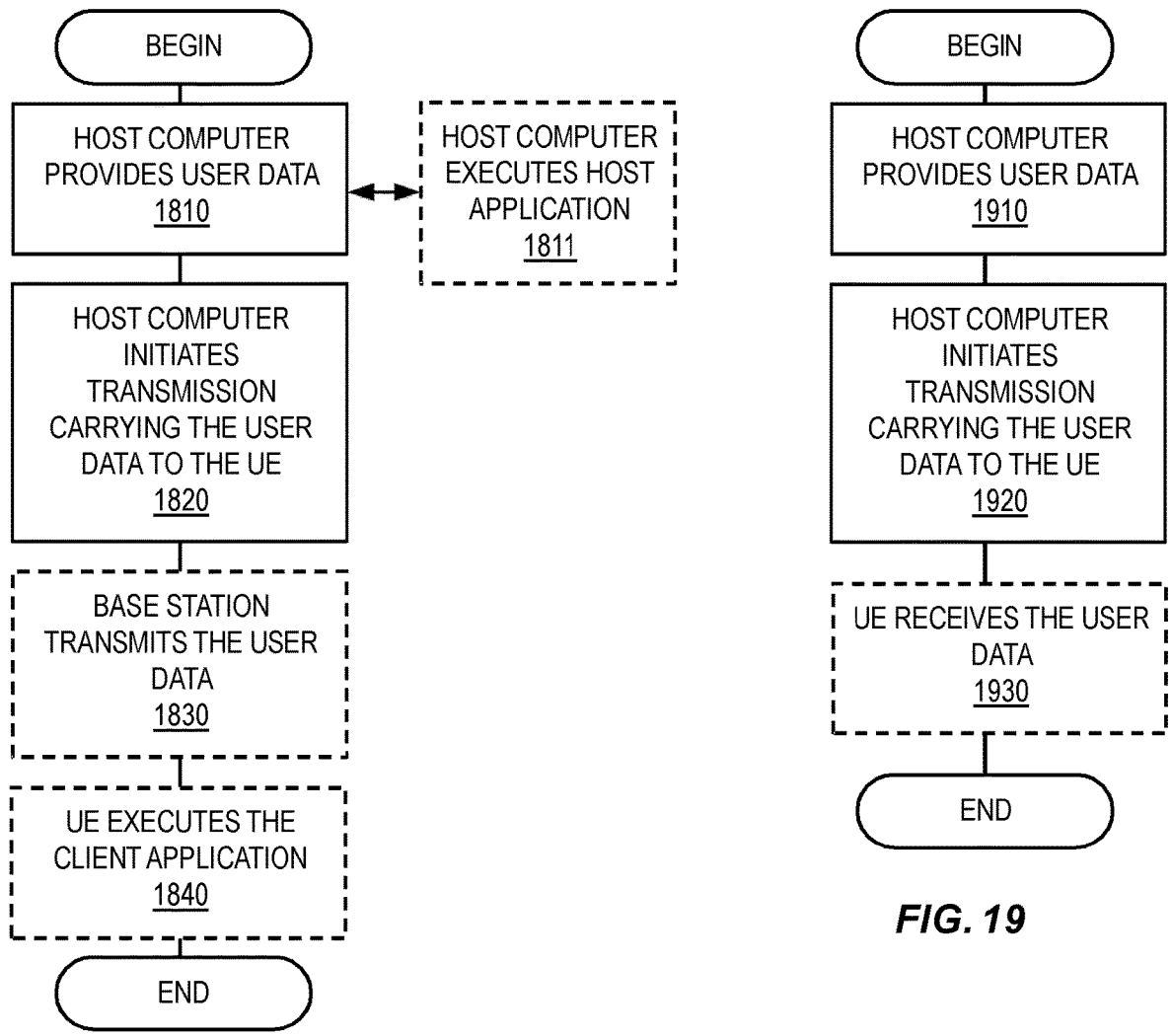

GROUP DATA MANAGEMENT IN 5G CORE NETWORK (5GC)

CROSS-REFERENCE TO RELATED APPLICATIONS

This application is a Submission Under 35 U.S.C. § 371 for U.S. National Stage Patent Application of International Application No.: PCT/EP2019/086812, filed Dec. 20, 2019 entitled "GROUP DATA MANAGEMENT IN 5G CORE NETWORK (5GC)," which claims priority to European Application No.: 19382134.5, filed Feb. 22, 2019, the entireties of both of which are incorporated herein by reference.

TECHNICAL FIELD

The present application relates generally to the field of telecommunications and more specifically to techniques that facilitate management and/or provisioning of data pertaining to a group of subscribers (e.g., users) in a communications network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases. One of the features of Release 11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third- ("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Procotol (IP) data packets (e.g., data or user plane) between the UE and the EPC, and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

In 3GPP, a study item on a new radio interface for a fifth-generation (5G) cellular (e.g., wireless) network has recently been completed. 3GPP is now standardizing this new radio interface, often abbreviated by NR (New Radio). FIG. 2 illustrates a high-level view of the 5G network architecture, consisting of a Next Generation RAN (NG-RAN) 299 and a 5G Core (5GC) 298. NG-RAN 299 can include a set of gNodeB's (gNBs) connected to the 5GC via one or more NG interfaces, such as gNBs 200, 250 connected via interfaces 202, 252, respectively. In addition, the gNBs can be connected to each other via one or more Xn interfaces, such as Xn interface 240 between gNBs 200 and 250. With respect the the NR interface to UEs, each of the gNBs can support frequency division duplexing (FDD), time division duplexing (TDD), or a combination thereof.

NG-RAN 299 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, Fl) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for CP and UP data on TNL of NG-RAN interfaces is supported, NDS/IP (3GPP TS 33.401) shall be applied.

The NG RAN logical nodes shown in FIG. 2 (and described in TS 38.401 and TR 38.801) include a central (or centralized) unit (CU or gNB-CU) and one or more distributed (or decentralized) units (DU or gNB-DU). For example, gNB 200 includes gNB-CU 210 and gNB-DUs 220 and 230. CUs (e.g., gNB-CU 210) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 222 and 232 shown in FIG. 2. The gNB-CU and connected gNB-DUs are only visible to other gNBs and the 5GC as a gNB. In other words, the F1 interface is not visible beyond gNB-CU.

FIG. 3 shows a high-level view of an exemplary 5G network architecture, including a Next Generation Radio Access Network (NG-RAN) 399 and a 5G Core (5GC) 398. As shown in the figure, NG-RAN 399 can include gNBs 310 (e.g., 310a,b) and ng-eNBs 320 (e.g., 320a,b) that are interconnected with each other via respective Xn interfaces. The gNBs and ng-eNBs are also connected via the NG interfaces to 5GC 398, more specifically to the AMF (Access and Mobility Management Function) 330 (e.g., AMFs 330a,b) via respective NG-C interfaces and to the UPF (User Plane Function) 340 (e.g., UPFs 340a,b) via respective NG-U interfaces.

Each of the gNBs 310 can support the NR radio interface, including frequency division duplexing (FDD), time division duplexing (TDD), or a combination thereof. In contrast, each of ng-eNBs 320 supports the LTE radio interface but, unlike conventional LTE eNBs (such as shown in FIG. 1), connect to the 5GC via the NG interface.

Deployments based on different 3GPP architecture options (e.g., EPC-based or 5GC-based) and UEs with different capabilities (e.g., EPC NAS and 5GC NAS) may coexist at the same time within one network (e.g., PLMN). It is generally assumed that a UE that can support 5GC NAS procedures can also support EPC NAS procedures (e.g., as defined in 3GPP TS 24.301) to operate in legacy networks, such as when roaming. As such, the UE will use EPC NAS or 5GC NAS procedures depending on the core network (CN) by which it is served.

Another change in 5G networks (e.g., in 5GC) is that traditional peer-to-peer interfaces and protocols (e.g., those found in LTE/EPC networks) are modified by a so-called Service Based Architecture (SBA) in which Network Functions (NFs) provide one or more services to one or more service consumers. A NF service is a type of capability exposed by one NF (Service Producer) to other authorized NFs (Service Consumers) through a service-based interface (SBI). A NF service may support one or more NF service operation(s). Access to these various services can be provided, for example, by Hyper Text Transfer Protocol/Representational State Transfer (HTTP/REST) application programming interfaces (APIs). In general, the various services are self-contained functionalities that can be changed and modified in an isolated manner without affecting other services.

Furthermore, the services are composed of various "service operations", which are more granular divisions of the overall service functionality. In order to access a service, both the service name and the targeted service operation must be indicated. The interactions between service consumers and producers can be of the type "request/response" or "subscribe/notify". In the 5G SBA, network repository functions (NRF) allow every network function to discover the services offered by other network functions, and Data Storage Functions (DSF) allow every network function to store its context.

The Network Exposure Function (NEF) within the 5GC SBA provides exposure of capabilities and events of the 5GC to application functions (AFs) within the 5GC and outside of the 5GC. For example, NEF provides a service that allows an AF to provision specific subscription data (e.g., Expected UE behavior) for various UEs. As the external parameter provisioning and subscription data management operations are currently defined, however, it is only possible for the AF to provision subscription parameters on a per-UE basis, e.g., based on an individual UE external identity (referred to as "GPSI"). Although there is interest in external provisioning of group data (e.g., expected UE behavior related to a group of UEs), there is no solution specified by 3GPP for achieving this desired feature.

SUMMARY

Accordingly, exemplary embodiments of the present disclosure address these and other difficulties in deployment of network functions in communication networks, such as 5G core (5GC) networks.

Exemplary embodiments of the present disclosure include methods and/or procedures for provisioning subscription data, for a plurality of subscribers, to one or more network functions (NFs) in a communication network. The exemplary method and/or procedure can be performed by a data management function and/or node (e.g., by a UDM associated with a UDR) in the communication network.

In some embodiments, the exemplary method and/or procedure can include receiving, from a further NF in the communications network, a first group identifier (GID) and identifiers for a plurality of subscribers that are members of a group identified by the first GID. In some embodiments, the exemplary method and/or procedure can include receiving, from a further NF, the first GID and the group data associated with the plurality of subscribers. The exemplary method and/or procedure can also include storing the group data, related to the plurality of subscribers, in association with at least the first GID, but not in association with individual subscription data for the respective subscribers.

In some embodiments, the exemplary method and/or procedure can also include receiving, from the one or more NFs, respective notification requests related to the first GID. The exemplary method and/or procedure can also include sending, to the one or more NFs, the group data and the first GID, e.g., in response to the notification requests received.

In some embodiments, the exemplary method and/or procedure can also include receiving, from a particular NF, a request for subscription data for a particular subscriber. The exemplary method and/or procedure can also include sending, to the particular NF, the first GID and individual subscription data for the particular subscriber, e.g., in response to the received request for subscription data. In some embodiments, the exemplary method and/or procedure can also include receiving from an an application function (AF) a request for the group data, with the request including a second GID associated with the group data. In such embodiments, the exemplary method and/or procedure can also include sending, to the AF, the second GID and the group data.

In some embodiments, the exemplary method and/or procedure can also include receiving, from an AF, the second GID and updated group data associated with the plurality of subscribers. In such embodiments, the exemplary method and/or procedure can also include storing the updated group data in association with the first and second GIDs but not in association with individual subscription data for the respective subscribers. In such embodiments, the exemplary method and/or procedure can also include sending, to the one or more NFs, the updated group data and the first GID, e.g., in response to respective notification requests from the one or more NFs.

Other exemplary embodiments of the present disclosure include other methods and/or procedures for provisioning subscription data, for a plurality of subscribers, to a network function (NF) in a communication network. These exemplary method and/or procedure can be performed by a network function and/or node (NF, e.g., AMF, SMF, UPF, PCF, etc.) in a communication network that also includes a data management function (e.g., UDM/UDR).

In some embodiments, the exemplary method and/or procedure can include sending, to the data management function, a notification request related to a first group identifier (GID). The exemplary method and/or procedure can also include receiving, from the data management function, group data related to a plurality of subscribers and the first GID that is associated with the group data. For example, the group data and the first GID can be received in response to the notification request. The exemplary method and/or procedure can also include storing the received group data in association with the first GID but not in association with individual subscription data for the respective subscribers.

In some embodiments, the exemplary method and/or procedure can include receiving a request to register a particular one of the subscribers in the NF. In such embodiments, the exemplary method and/or procedure can also include sending, to the data management function, a request for subscription data for the particular subscriber. The exemplary method and/or procedure can also include receiving, from the data management function, the first GID and individual subscription data for the particular subscriber. These can be received, for example, in response to the request for such data.

The exemplary method and/or procedure can also include creating a context, for the particular subscriber, including the individual subscription data and a reference to the stored group data. For example, the reference can be the first GID. In this manner, the group data can be part of the particular subscriber's context without being stored together with the individual subscriber context, but rather in a single location that can be referenced by respective contexts for each group member registered in the NF.

In some embodiments, the exemplary method and/or procedure can also include receiving, from the data management function, the first GID and updated group data related to the plurality of subscribers. In such embodiments, the exemplary method and/or procedure can also include, based on the received updated group data, updating the stored group data associated with the first GID. In such embodiments, after the stored group data is updated in this manner, the contexts for the registered group members can reference the updated stored group data without changing the individual contexts themselves.

Other exemplary embodiments include network functions (NFs, e.g., UDM, AMF, SMF, UPF, PCF, AF, etc.), nodes, and/or services (e.g., NF components) configured to perform operations corresponding to the exemplary methods and/or procedures. Other exemplary embodiments include non-transitory, computer-readable media storing computer-executable instructions that, when executed by a processing circuit, configure a NF to perform operations corresponding to the exemplary methods and/or procedures.

BRIEF DESCRIPTION OF THE DRAWINGS

FIGS. 18-21 are flow diagrams of exemplary methods and/or procedures for transmission and/or reception of user data that can be implemented, for example, in the exemplary communication systems and/or networks illustrated in FIGS. 16-17.

DETAILED DESCRIPTION

Figure 1:
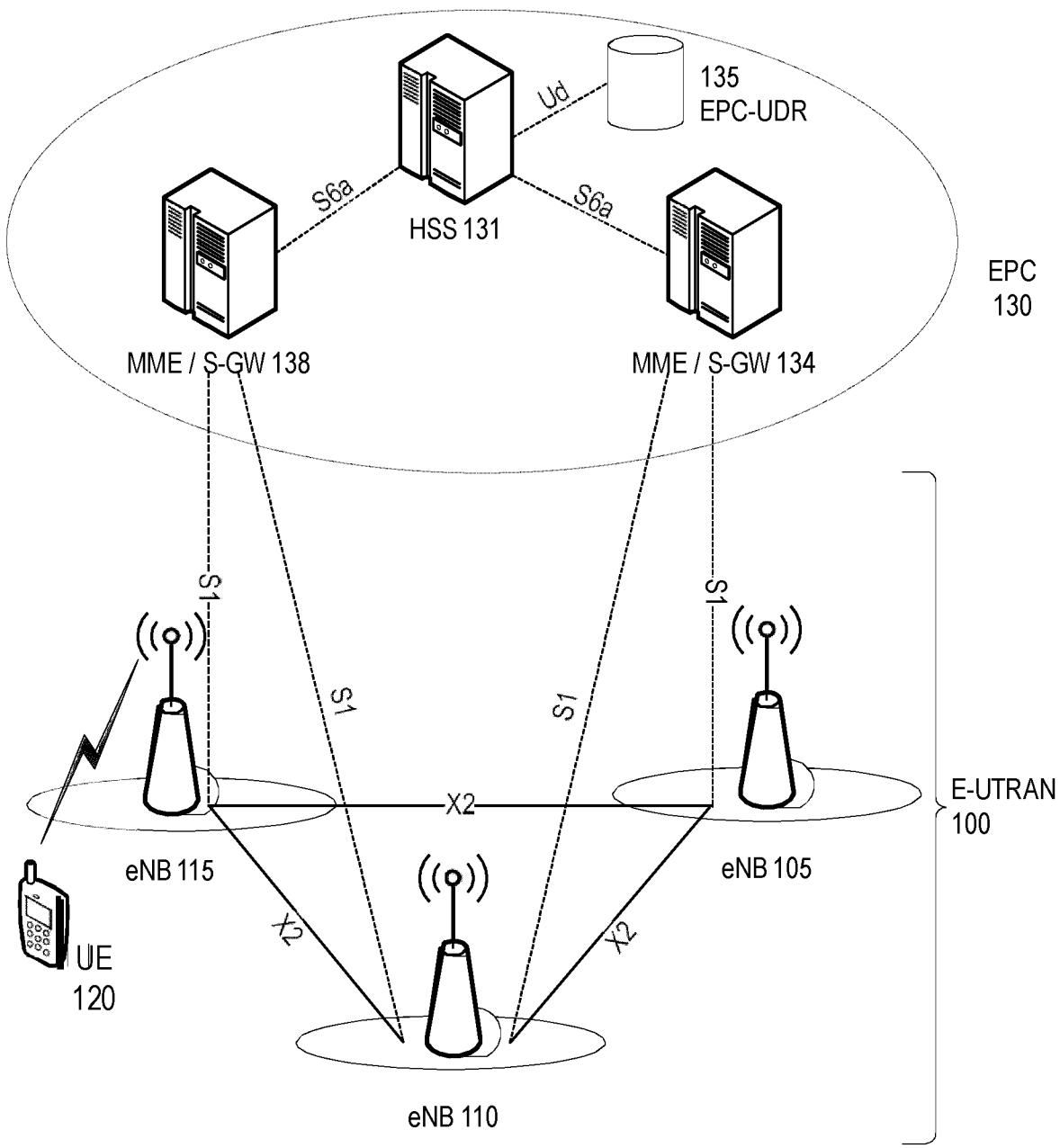
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2:
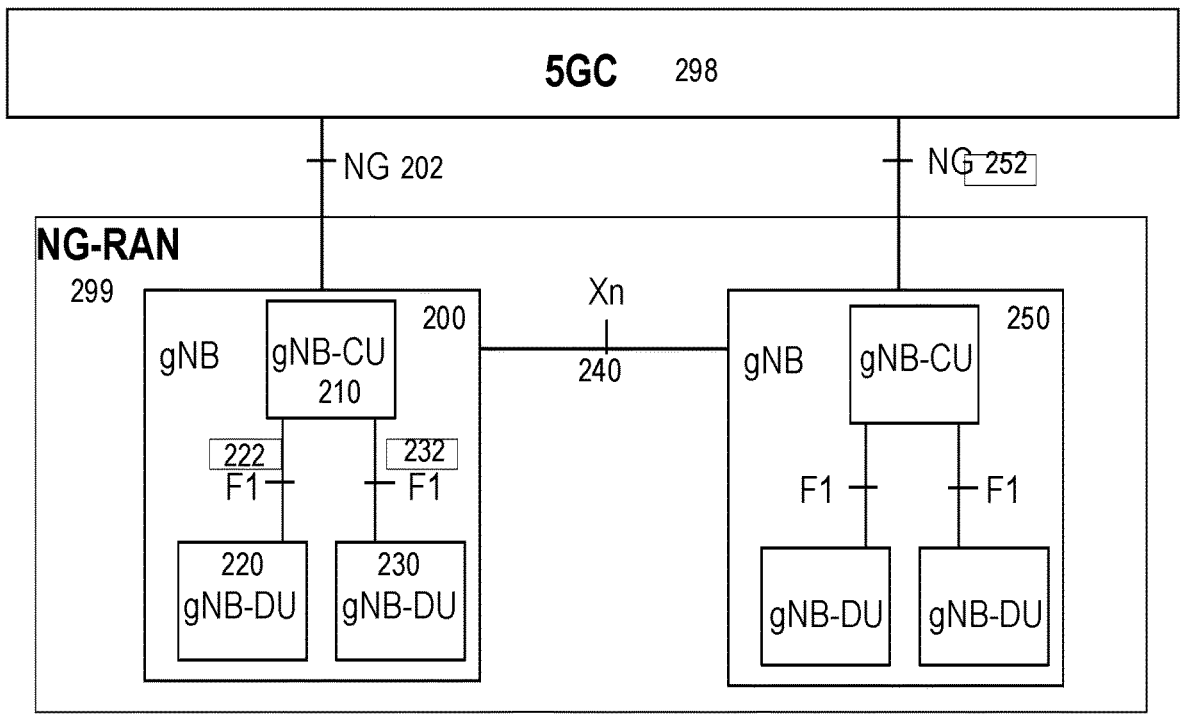
FIGS. 2-3 illustrate two different high-level views of a 5G network architecture.
Figure 3:
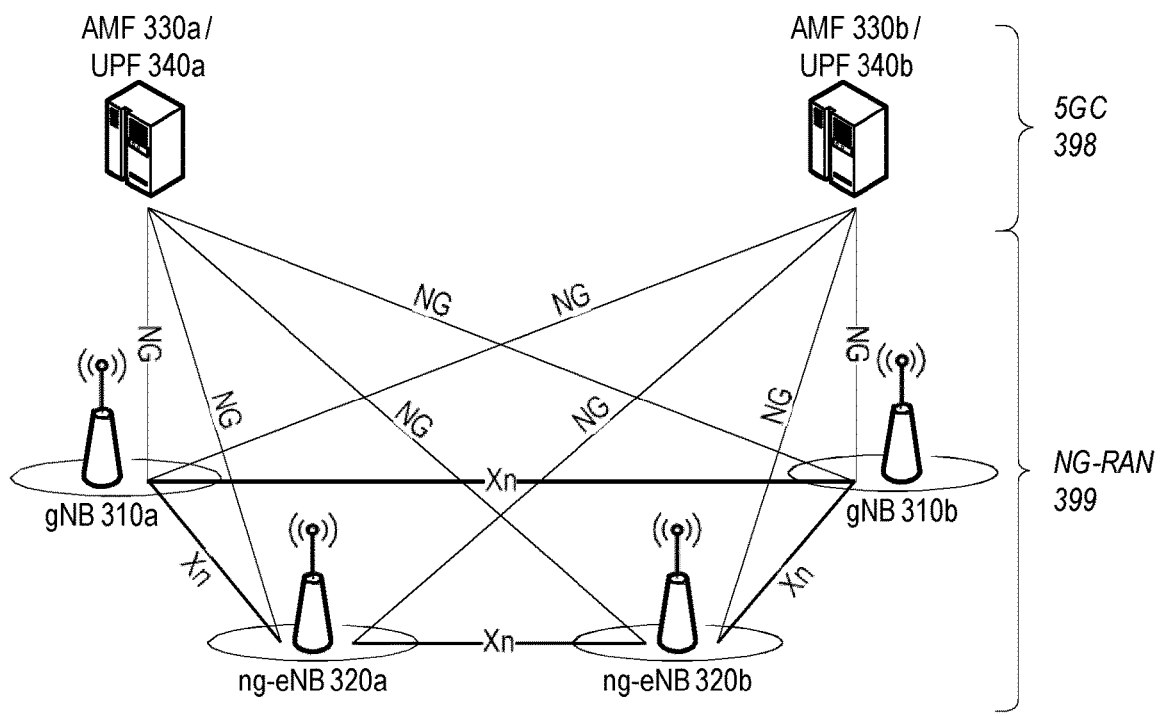
Figure 4:
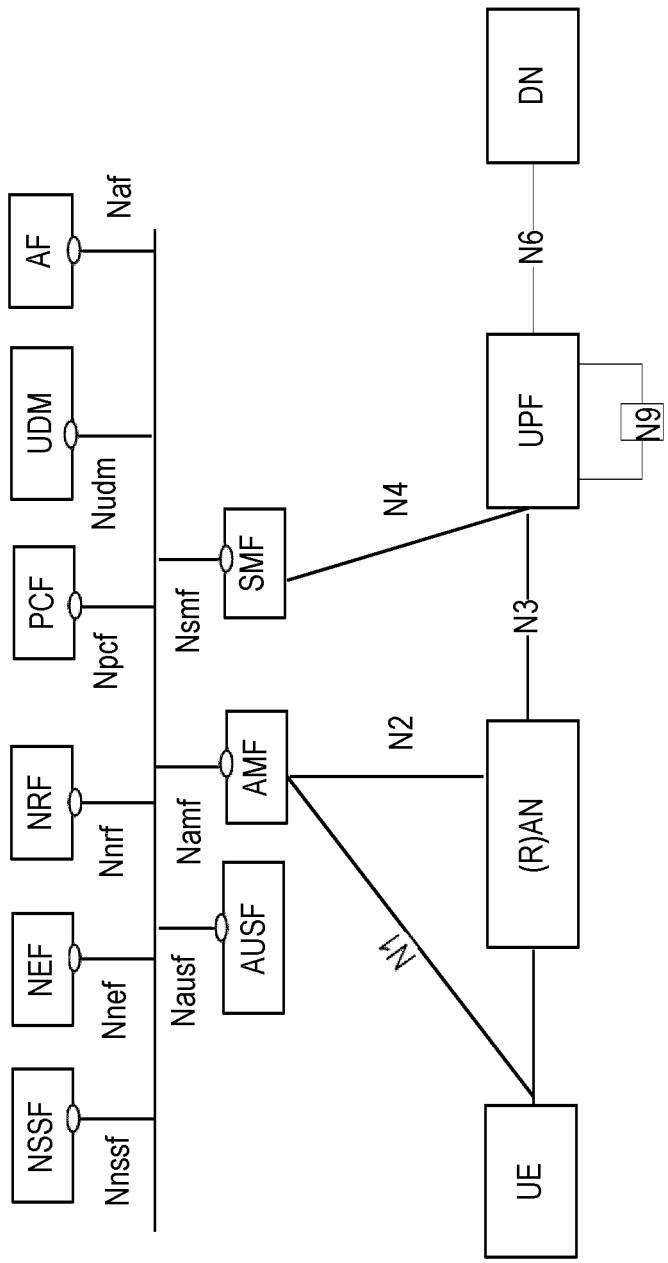
FIGS. 4-5 show, respectively, exemplary non-roaming and home-routed roaming 5G reference architectures with service-based interfaces and various network functions (NFs), as further described in 3GPP TS 23.501.

Exemplary embodiments briefly summarized above will now be described more fully with reference to the accompanying drawings. These descriptions are provided by way of example to explain the subject matter to those skilled in the art, and should not be construed as limiting the scope of the subject matter to only the embodiments described herein. More specifically, examples are provided below that illustrate the operation of various embodiments according to the advantages discussed above. Furthermore, the following terms are used throughout the description given below:

As discussed above, in the 5G service-based architecture (SBA), services can be deployed as part of a network function (NF). This SBA model, which further adopts principles like modularity, reusability and self-containment of NFs, can enable deployments to take advantage of the latest virtualization and software technologies. FIG. 4 shows an exemplary non-roaming 5G reference architecture with service-based interfaces and various 3GPP-defined NFs within the Control Plane (CP). These include:

Access and Mobility Management Function (AMF) with Namf interface;
Session Management Function (SMF) with Nsmf interface;
User Plane Function (UPF) with Nupf interface;
Policy Control Function (PCF) with Npcf interface;
Network Exposure Function (NEF) with Nnef interface;
Network Repository Function (NRF) with Nnrf interface;
Network Slice Selection Function (NSSF) with Nnssf interface;
Authentication Server Function (AUSF) with Nausf interface;
Application Function (AF) with Naf interface; and
Unified Data Management (UDM) with Nudm interface.

The UDM is similar to the HSS in LTE/EPC networks discussed above. UDM supports Generation of 3GPP AKA authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

Figure 5:
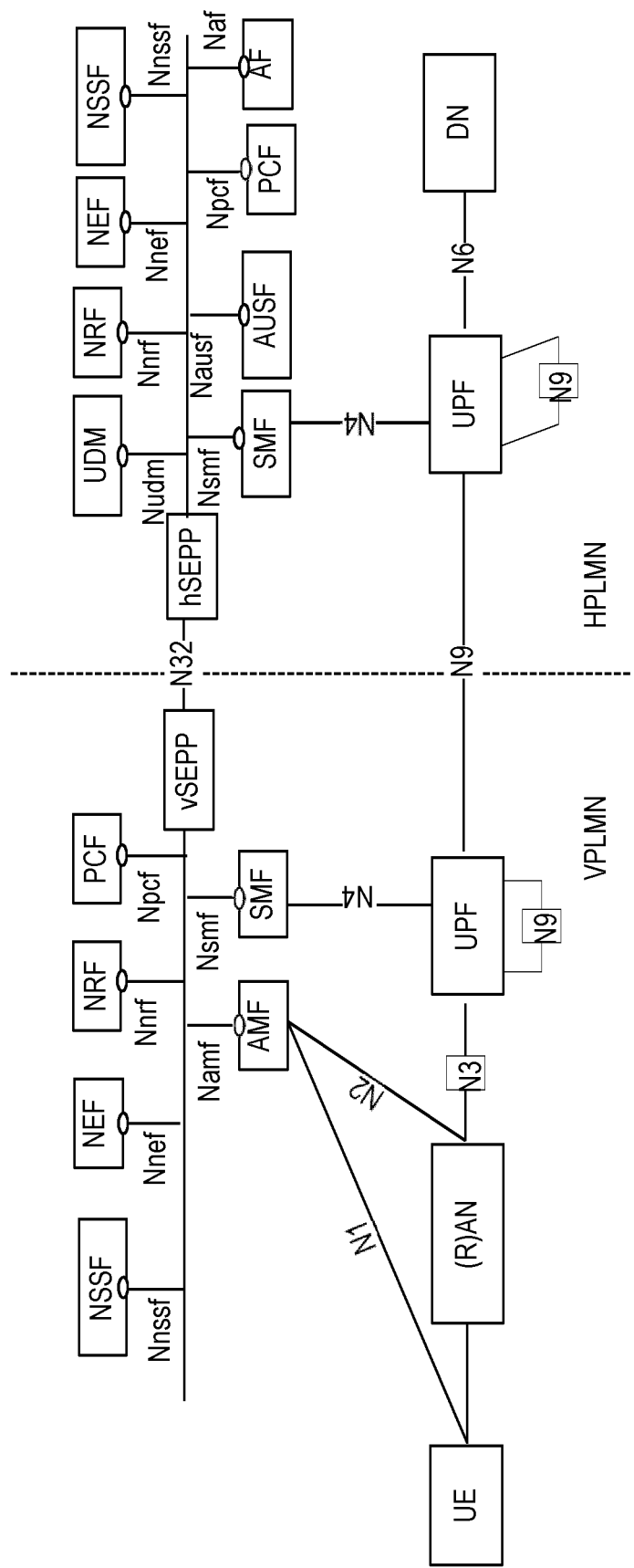

FIG. 5 shows an exemplary roaming 5G reference architecture with service-based interfaces. In this reference architecture, the user roams into a Visited Public Land Mobile Network (VPLMN) that is different than the user's Home PLMN (HPLMN). In particular, FIG. 5 shows a roaming architecture that supports home-routed data services, in which the home operator's administrative domain is involved in the user's data session and the UE interfaces the data network (DN) in the HPLMN. From the user's perspective, the various network functions of the HPLMN shown in the non-roaming architecture of FIG. 4 are distributed among the HPLMN and VPLMN in the home-routed roaming architecture shown in FIG. 5. For example, the AMF is in the VPLMN, the AUSF is in the HPLMN, and the SMF and UPF exist in both (e.g., are split between) VPLMN and HPLMN. To distinguish between these functions existing in both networks, a prefix of "H" or "V" can be used, such as "H-UPF" and "V-UPF".

The services in 5GC will likely be built in a stateless way, such that the business logic and data context will be separated. This means that the services store their context externally in a proprietary database. This can facilitate various cloud infrastructure features like auto-scaling or auto-healing. As briefly discussed above, a single NF can provide multiple services that, in some cases, can have common access to the same data in the proprietary database.

As briefly mentioned above, the Network Exposure Function (NEF) within the 5GC SBA provides exposure of capabilities and events of the 5GC to application functions (AFs) within the 5GC and outside of the 5GC. For example, NEF provides a service that allows an AF to provision specific subscription data (e.g., Expected UE behavior) for various UEs. More specifically, NEF (together with UDM) supports Nnef/udm_ParameterProvision service which allows an AF to provision UE-specific subscription data (e.g. Expected UE behavior) in the UDM/UDR.

Figure 6:
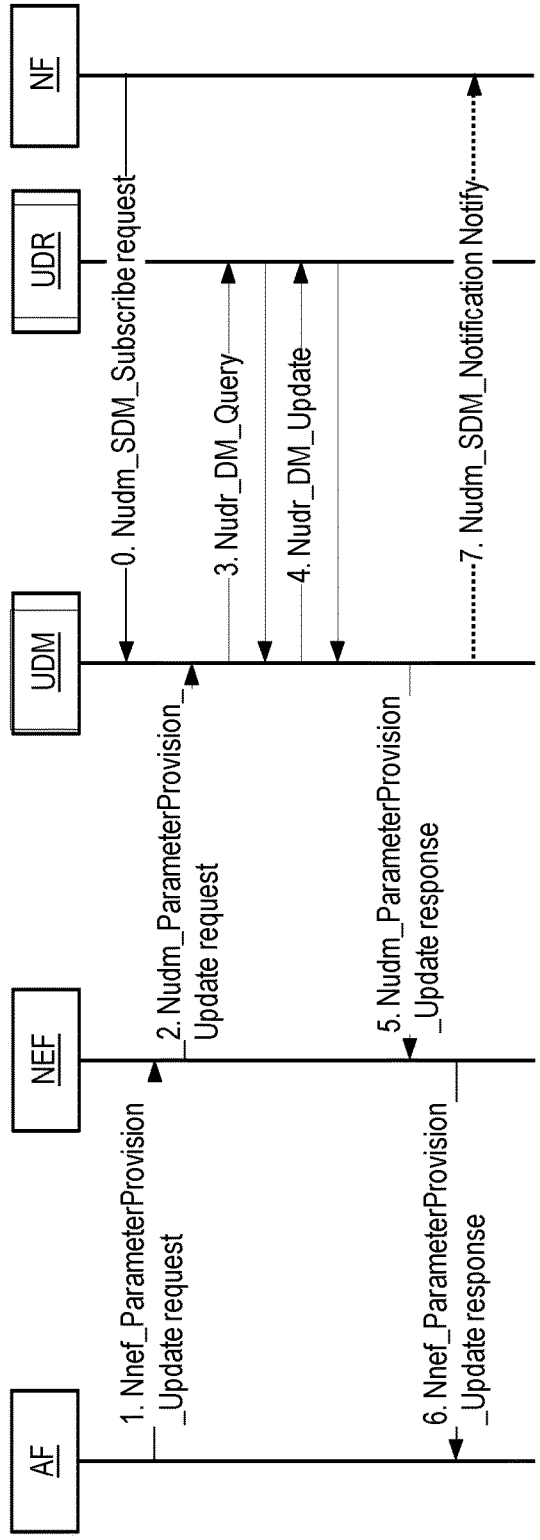
FIG. 6 shows a signalling flow diagram for an exemplary Nnef/udm_ParameterProvision service, as specified in 3GPP TS 23.502

FIG. 6 shows an signalling flow diagram for an exemplary Nnef/udm_ParameterProvision service, as defined in 3GPP TS 23.502. Although the operations shown in FIG. 6 are labelled numerically, this labelling is used for clarity of description and ease of understanding, and should not be interpreted as limiting the operations to occur in the order of their numerical labelling. In other words, unless expressly noted otherwise, the operations shown in FIG. 6 can occur in different orders than shown, and can be combined and/or divided to form other operations. The operations shown in FIG. 6 are described as follows. To the extent that this description refers to 3GPP standards, the relevant portions of these standards are incorporated herein by reference.

In operation 0, a particular NF (e.g., AMF) sends to the UDM a Nudm_SDM_Subscribe request message for subscribing to notifications about modifications to subscriber data stored in UDM. This operation is part of the subscriber data management service Nudm_SDM. In operation 1, a particular AF sends a Nnef_ParameterProvision_Update request to the NEF. This message can include one or more UE parameters to be updated, along with a GPSI that identifies the UE. In operation 2, if the AF is authorized to provision the parameters, the NEF requests to update and store the provisioned parameters as part of the subscriber data via Nudm_ParameterProvision_Update Request message to the UDM, which includes the provisioned data and GPSI.

In optional operation 3, the UDM can read from UDR, by means of Nudr_DM_Query, corresponding subscriber information in order to validate required data updates and authorize these changes for this subscriber with respect to the requesting AF. In optional operation 4, if the AF is authorised by the UDM to provision the parameters for this subscriber, the UDM requests to update and store the provisioned parameters as part of the subscriber data via Nudr_DM_Update Request message, which includes the provisioned data. UDR stores the provisioned data as part of the subscription data and responds with Nudr_DM_Update Response message. In FIG. 6, these two messages are shown as a single Nudr_DM_Update procedure.

In operation 5, UDM responds to the request from operation 1 with a Nudm_ParameterProvision_Update Response message. If the procedure failed, a cause value indicates a reason for failure. In operation 6, the NEF forwards this information to the requesting AF. In operation 7, the UDM notifies the subscribed Network Function (e.g., AMF) of the updated subscriber data via a Nudm_SDM_Notification Notify message.

3GPP Rel-15 also specifies (e.g., in 3GPP TS 23.501 and 23.502) a Network Data Analytics Function (NWDAF) including services (referred to as "Nnwdaf") that facilitate basic policy and network slicing control based on analytics. 3GPP Rel-16 enhances the Re-15 analytics architecture and services based on a new 3GPP TS 23.288. One of the use cases included in 23.288 is External Parameter Provisioning by the NWDAF for Expected UE behavior information.

Figure 7:
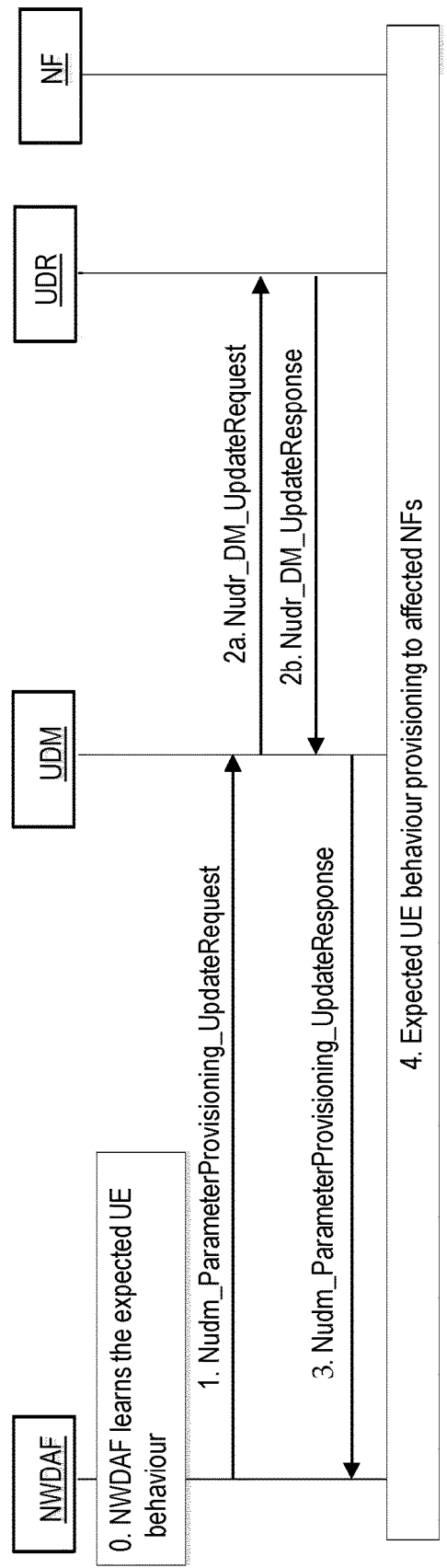
FIG. 7 shows a signalling flow diagram for an exemplary NWDAF-assisted expected UE behavioral parameters provisioning procedure, as specified in 3GPP TS 23.288.

FIG. 7 shows a signalling flow diagram for an exemplary NWDAF-assisted expected UE behavioral parameters provisioning procedure, as specified in 3GPP TS 23.288. Although the operations shown in FIG. 7 are labelled numerically, this labelling is used for clarity of description and ease of understanding, and should not be interpreted as limiting the operations to occur in the order of their numerical labelling. In other words, unless expressly noted otherwise, the operations shown in FIG. 7 can occur in different orders than shown, and can be combined and/or divided to form other operations. The operations shown in FIG. 7 are described as follows.

In operation 0, the NWDAF may learn the Expected UE behavior by retrieving corresponding input data using services Namf_EventExposure (provided by AMF) and Nudm_EventExposure (provided by UDM). Exemplary UE behaviour information that can be retried in this manner is shown in Table 1 below. Note that the retrieved input data is per 5G Subscription Permanent Identifier (SUPI), which is a globally unique identifier allocated to each subscriber in the 5G System and provisioned in the UDM/UDR.

TABLE 1

| Information | Source | Description |
| --- | --- | --- |
| UE ID | AMF | Could be e.g. SUPI, which is used by NWDAF to correlate the UE behavioral information from different 5GC NFs. |
| Communication start or end time | | Start time when the UE is available for communication or end time when the UE is unavailable for communication. |
| UL or DL Packet Latency | | Indicating the delay for uplink or downlink packets transfers for the UE. |
| UL or DL data rate | | Indicating the bit rate for uplink or downlink packets transfers for the UE. |
| Frequent mobility re-registration | AMF | A stationary UE may re-select between neighbor cells due to radio coverage fluctuations. This may lead to multiple re-registrations if the cells belong to different registration areas. The number of re-registrations may be an indication for abnormal behavior. |
| Location Reporting | AMF | As specified in 3GPP TS 23.502 Table 4.15.3.1-1. |
| Communication failure | AMF | |
| Availability after DNN failure | AMF | |
| Number of UEs present in a geographical area | AMF | |
| Change of SUPI-PEI association | UDM | |
| Roaming status | UDM | |

As shown in FIG. 7, in operation 1, the NWDAF sends a Nudm_ParameterProvision_Update Request to the UDM (similar to operation 2 in FIG. 6) that includes the Expected UE behaviour information obtained in operation 0. In operation 2, the UDM requests to update and store the Expected UE behaviour information as part of the subscriber data via Nudr_DM_Update Request message. UDR stores the Expected UE behaviour information as part of the subscription data and responds with Nudr_DM_Update Response message. In general, operation 2 can be similar to operation 4 in FIG. 6. In operation 3, UDM responds to the request from operation 1 with a Nudm_ParameterProvision_Update Response message. In operation 4 of FIG. 7, the UDM can provision the updated Expected UE behaviour to various affected NFs, such as NFs that have subscribed to updates.

As the external parameter provisioning and SDM operations are currently defined, it is only possible for the AF to provision subscription parameters on a per UE basis. In other words, the Nnef/udm_ParameterProvision service currently only supports, as an input parameter, a single individual external UE identity (GPSI). Even so, some of the Rel-16 Work Items (WIs) now require support for management of Group Data in the 5GC. As such, NEF or NWDAF could be required to provision in UDM/UDR Expected UE behavior information related to a group of UEs.

Figure 8:
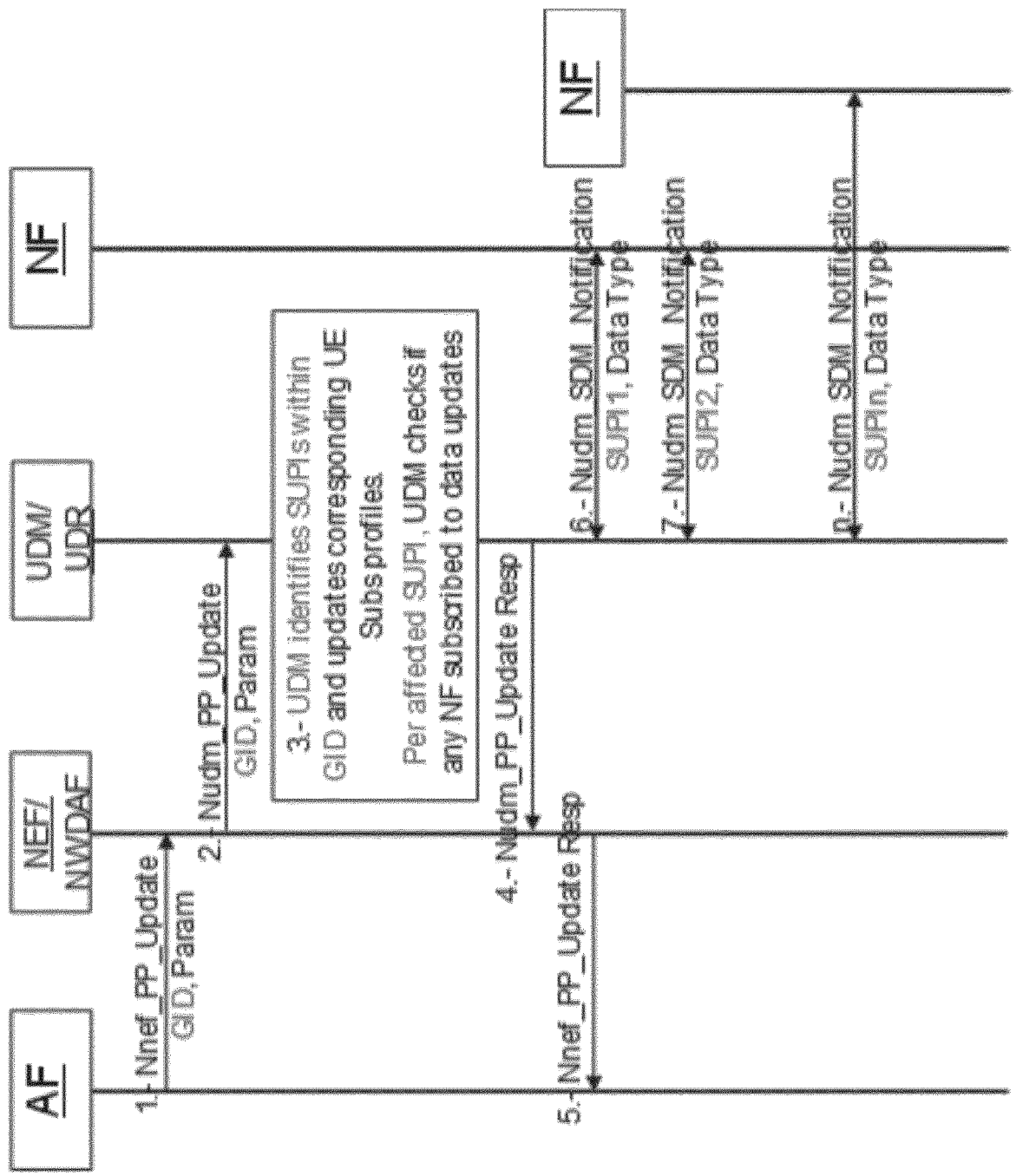
FIG. 8 shows a signalling flow diagram for an exemplary group handling technique for an expected UE behavioral parameters provisioning procedure, according to various exemplary embodiments of the present disclosure.

FIG. 8 shows a signalling flow diagram for an exemplary group handling technique for an expected UE behavioral parameters provisioning procedure, according to various exemplary embodiments of the present disclosure. Although the operations shown in FIG. 8 are labelled numerically, this labelling is used for clarity of description and ease of understanding, and should not be interpreted as limiting the operations to occur in the order of their numerical labelling. In other words, unless expressly noted otherwise, the operations shown in FIG. 8 can occur in different orders than shown, and can be combined and/or divided to form other operations.

In FIG. 8, "PP" is used as an abbreviation for "ParameterProvision" or "ParameterProvisioning." In the exemplary technique shown in FIG. 8, the request from the AF to the UDM via the NEF or NWDAF includes a group ID ("GID"). After receiving the request, the UDM identifies individual UEs (e.g., SUPIs) associated with the GID, updates corresponding UE subscription information, and notifies NFs that have subscribed to updates concerning the respective updated SUPIs.

Since the Nudm_SDM service requires subscriptions to be on a per SUPI basis, when subscription data changes affect a group of users, the UDM may be required to produce a large number of Nudm_SDM notifications, i.e., one notification per SUPI per subscribed NF. For at least this reason, it is not desirable to extend conventional Nudm_SDM operations to be used for Group Data Handling as illustrated in FIG. 8.

In addition, even if the Expected UE behaviour is provided in association with a GID as illustrated in FIG. 8, the same subscription information applicable to all the UEs within the group is replicated in individual subscription profiles and UE context in various repositories and/or NFs in 5GC. This includes UDM/UDR, AMF, SMF, etc. This results in increased storage requirements in 5GC. Furthermore, the Nnef/udm_ParameterProvision services only support an Update operation to push the subscription parameters to be updated in UDM/UDR. There is no operation (e.g., "Read") within this family to obtain subscription parameters already provisioned.

Exemplary embodiments of the present disclosure address these and other problems, challenges, and/or issues by providing a novel SBA framework for handling subscription data associated with a group of users. In the context of the 5GC SBA, this can be referred to as a Group Data Management (GDM) framework. This GDM framework can include new GDM services (e.g., Nnef/udm_GroupDataManagement) that facilitate an external AF to manage (e.g., via via NEF and UDM/UDR) subscription profile information related associated with a group of UEs that are identified by a Group ID. Such GDM services facilitate both updating (e.g., writing) group data as well as reading group data.

Furthermore, the novel GDM framework can also include new group management (GM) services (e.g., Nnef/udm_GroupManagement) services that facilitate an external AF to create (e.g., via NEF or NWDAF) Group Identifiers (GIDs) for a later use. For example, later uses can include adding and removing users/devices associated with the created GID.

In addition, the novel GDM framework can also include a new Nnf GDM service exposed by relevant NFs (e.g. AMF, SMF, etc.) to receive subscription profile information related to a Group of UEs. Once received by an NF, the group-related subscription profile information can be stored only once at the receiving NF. Note that according to exemplary embodiments, the Nnf_GDM service is offered by each relevant NF rather than by the UDM itself. Such an arrangement allows the UDM to deliver group data information to an NF supporting this service at any time and independent of the registration status of the users associated with a GID in the NF.

According to exemplary embodiments of the new GDM framework, 5GC NFs can apply group data to registered, or registering, UEs in the network that belong to a corresponding group. Furthermore, each NF can be aware of the association and/or membership of UEs to groups based on subscription data for individual UEs received via Nudm_SDM operations when individual UEs register in the NFs.

In this manner, such techniques can facilitate an improved and/or more optimal handling of subscription data related to a group of users within the 5GC. For example, this new GDM framework can facilitate management of group data by external AFs and other NFs within the 5GC, including read, update, and delete operations. As another example, this new GDM framework can simplify and/or reduce internal interactions between a UDM and relevant NFs within the 5GC. More specifically, when the groups are very large (e.g., millions of UEs), it avoids massive signaling across the network when the group data needs to be updated. As another example, this new GDM framework can facilitate relevant NFs to receive the group data profile information regardless of the registration status in the NF of the users/devices associated to the group. As another example, such techniques can reduce storage requirements in 5GC NFs (e.g., UDM/UDR, AMF, SMF, etc.) since the group data is commonly stored in each NF and shared by all users/devices.

Figure 9:
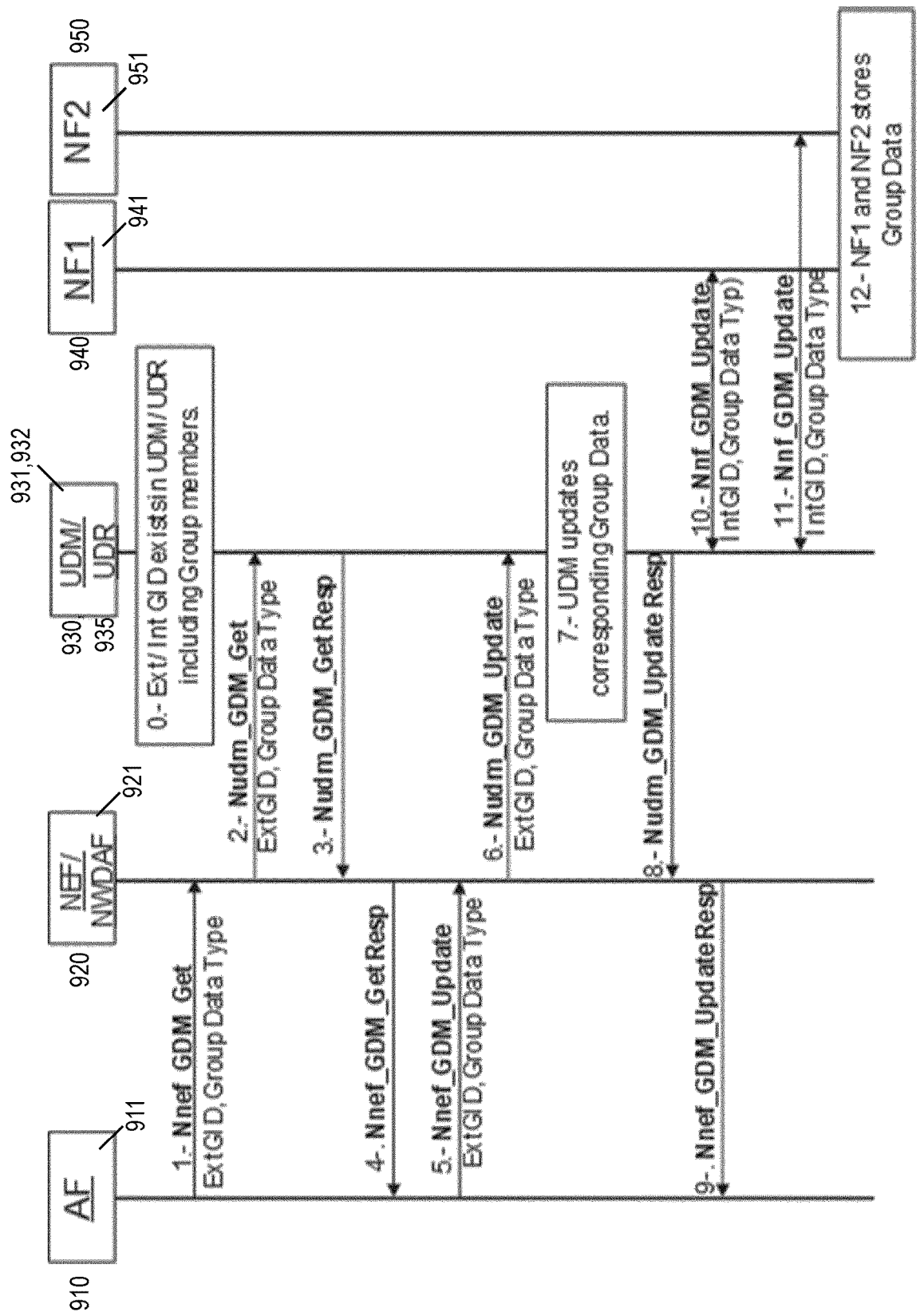
FIG. 9 shows an exemplary signalling flow diagram illustrating a group data management (GDM) framework, according to various exemplary embodiments of the present disclosure

FIG. 9 shows an exemplary signalling flow diagram illustrating the new GDM framework, according to various exemplary embodiments of the present disclosure. Although the operations shown in FIG. 9 are labelled numerically, this labelling is used for clarity of description and ease of understanding, and should not be interpreted as limiting the operations to occur in the order of their numerical labelling. In other words, unless expressly noted otherwise, the operations shown in FIG. 9 can occur in different orders than shown, and can be combined and/or divided to form other operations. The operations shown in FIG. 9 are described as follows, but to the extent that this description refers to 3GPP standards, the relevant portions of these standards are also incorporated herein by reference.

The exemplary signalling flow shown in FIG. 9 is among several network functions associated with (e.g., internal or external to) a 5GC. Each of these functions can include various group data management (GDM) services and/or operations. For example, an external AF 910 can include services 911, an internal NEF 920 (or NWDAF 920, in some alternatives) can include services 921, and NFs 940 and 950 can include services 941 and 951, respectively. UDM 930 can include GDM services 931 corresponding to NEF services 921, as well as GDM services 932 corresponding NF services 941, 951. UDM is also associated with UDR 935. For conciseness, the following description refers to the respective NFs shown in FIG. 9 without their associated reference numbers.

Operation 0 represents an assumed initial condition in the 5GC. More specifically, the definition of a group and the group members is assumed to have been provisioned in UDM/UDR. In some embodiments, such Groups can be created and managed in UDM via new Nnef/udm_GroupManagement services. Such services can include a number of operations to create groups, add members, remove members, move members between groups, etc. The Subscription profile of each user can include internal GIDs of the groups that the user belongs to, as defined in 3GPP TS 23.502.

Operations 1-4 illustrate the procedure for an external AF to read subscription data related to a group of UEs from UDM/UDR. In operation 1, the AF sends a Nnef_GDM_Get message to the NEF (or NWDAF, as the case may be). This message can include an external GID (ExtGID) associated with the group, as well as an identifier of the type of group data requested. In operation 2, the NEF forwards this message as an Nudm_GDM_Get message to the UDM. In operation 3, the UDM retrieves the requested group data and responds with a Nudm_GDM_GetResp message including the requested group data. In these operations, the UDM may correlate the received ExtGID with an internal GID (IntGID) associated with the same group. In operation 4, the NEF forwards the requested data in a Nnef_GDM_GetResp message to the requesting AF. In this manner, the AF can receive the subscription data related to the group identified by ExtGID. In case no group data is yet defined for ExtGID, the UDM returns no data and can optionally return a failure cause value associated with the lack of group data.

In operation 5, the AF initiates an update of (e.g., creates, modifies, deletes) subscription data related to the group of UEs identified by ExtGID by sending a Nnef_GDM_Update message to the NEF (or NWDAF, as the case may be). This message can include ExtGID, as well as an identifier of the group subscription information to be updated. In operation 6, the NEF forwards this message as an Nudm_GDM_Update message to the UDM. In operation 7, so long as the requestor has update privileges, the UDM updates the stored subscription data related to the identified group of UEs as requested. In operation 8, the UDM responds with a Nudm_GDM_UpdateResp message indicating the update result, which the NEF sends to the requesting AF in operation 9 as a Nnef_GDM_UpdateResp message. In case group data is not updated as requested, the UDM can optionally return a failure cause value associated with the particular reason for the update failure.

In operations 10-11, using a Nnf_GDM_Update service operation, the UDM provides subscription data related to a group of UEs to relevant NFs, including NF1 and NF2 shown in FIG. 9. In this operation, the internal group ID (IntGID) can be used to identify the particular group. Moreover, the group data can be provided by the UDM in operations 10-11 regardless of the registration status of the group members in the respective NFs. In operation 12, the respective NFs can store the received group subscription data. After the operations in FIG. 9, NF1 and NF2 can apply the received group subscription data to the UEs associated to the group when these UEs register in the respective NF (e.g., in AMF).

Figure 10:
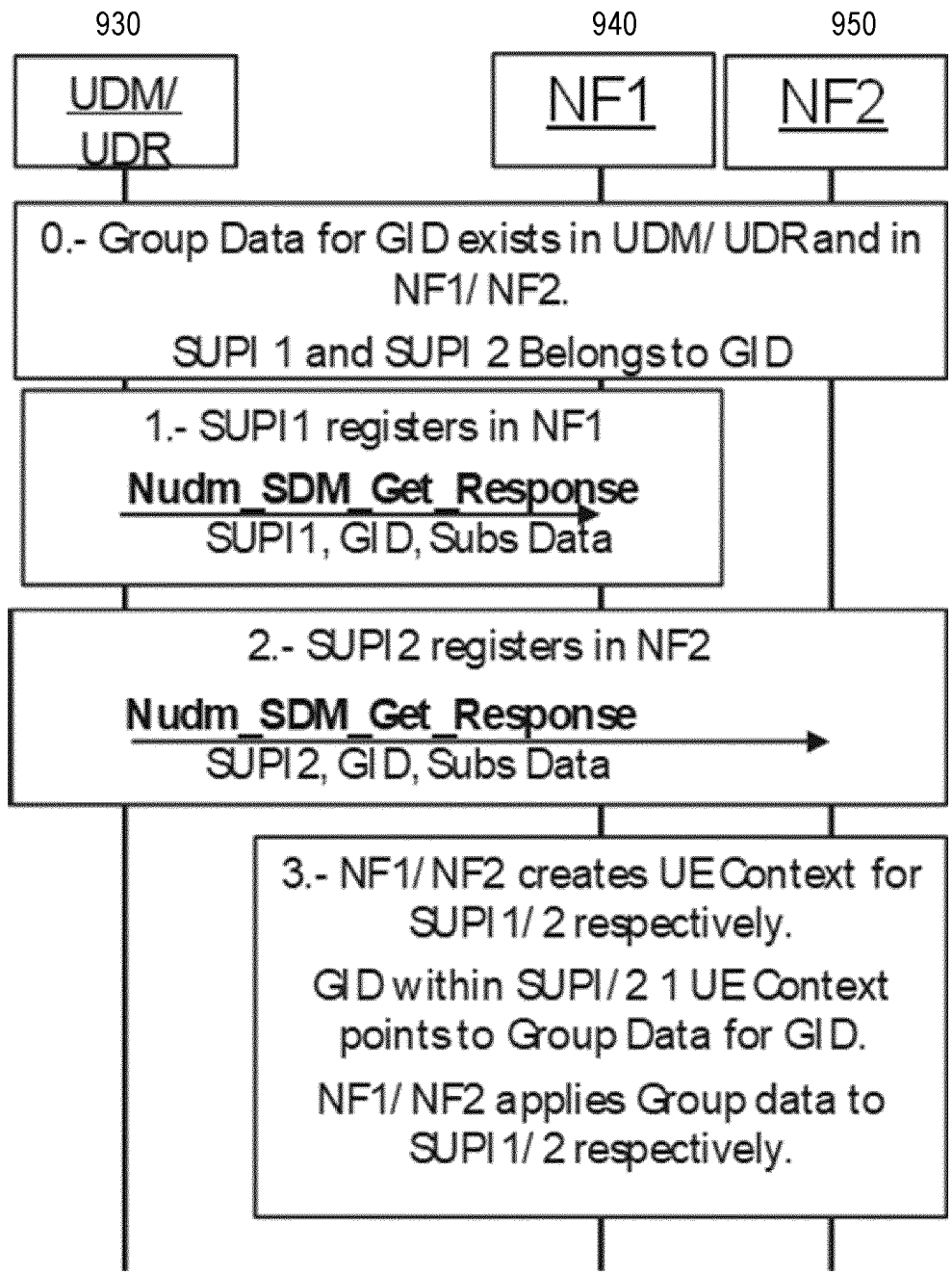
FIG. 10 shows a signalling flow diagram illustrating an exemplary application of group subscription data when UEs register in NFs, according to various exemplary embodiments of the present disclosure

FIG. 10 shows a signalling flow diagram illustrating an exemplary application of group subscription data when UEs register in NFs, according to various exemplary embodiments of the present disclosure. Although the operations shown in FIG. 10 are labelled numerically, this labelling is used for clarity of description and ease of understanding, and should not be interpreted as limiting the operations to occur in the order of their numerical labelling. In other words, unless expressly noted otherwise, the operations shown in FIG. 10 can occur in different orders than shown, and can be combined and/or divided to form other operations. The operations shown in FIG. 10 are described as follows, but to the extent that this description refers to 3GPP standards, the relevant portions of these standards are also incorporated herein by reference.

Operation 0 represents an assumed initial condition in the 5GC. More specifically, group data for a given group (represented by IntGID, or GID for short) is available in the UDM and in the relevant NFs, such as described above in relation to FIG. 9. As an example, the subscribers identified by SUPI1 and SUPI2 belong to GID.

In operation 1, subscriber SUPI1 registers in NF1 in the 5GC. NF1 performs the Nudm_SDM_Get operation (involving request/response) with the UDM to retrieve the subscription data associated with SUP1, which has been stored in UDR. In operation 2, subscriber SUPI2 registers in NF2 in the 5GC. NF2 performs the Nudm_SDM_Get operation (involving request/response) with the UDM to retrieve the subscription data associated with SUP2, which has been stored in UDR. The UDM also includes the GID in the respective Nudm_SDM_Get_Response messages to the NFs. Based on receiving this GID, the NFs become aware of the group membership(s) of SUP1 and SUP2. In operation 3, NF1 and NF2 create UE contexts for the respective SUPIs. The UE context includes the subscription data and the GID, which points to the group data previously provisioned in the NFs (e.g., via the operations shown in FIG. 9). This allows each NF to extend and/or supplement the individual subscription data received via Nudm_SDM_Get operation with the group data associated with GID. Furthermore, if the group data changes while group-member UEs are registered in a given NF, the UDM can update the GID-associated group data in the NF (e.g., via operations 10-12 of FIG. 9) and the NF will associate the updated group data with the individual subscription data.

In some embodiments, other authorized NFs (e.g., NWDAF) internal to the 5GC may be allowed to manage group data in UDM/UDR via Nudm_GDM service operations. In this case, the internal NF may be able to use the GID in the requests to UDM if GID is known to the internal NF. For example, NWDAF may read or update group subscription data from UDM/UDR using the Nudm_GDM_Get or Nudm_GDM_Update service operations, respectively, in a similar manner as shown in FIG. 9.

Note that when group data is provisioned in UDM, it is not necessary for the UDM to store the group data in the individual subscription profiles of the group members. Rather, the UDM can store the group data in association with the GID, and store the GID in association with the individual subscription profiles. However, it should be possible the UDM to provision, within individual subscription profiles, corresponding data with different settings than the group data as a way to apply exceptions to individual SUPIs within a particular group. In this case, a NF can apply the settings received within the individual subscription profile from UDM via Nudm_SDM service rather than the ones defined for the corresponding group received via the Nnf_GDM service.

Although the above embodiments refer to group data associated with individual UEs, in some embodiments, group data can be assigned and/or associated to generic groups of SUPIs. For example, groups can be formed that include all SUPIs belonging to PLMNID or a subscribed network slice (e.g., NSSAI), or based on other subscription-related parameter(s).

In some embodiments, the Nnef/udm_GDM service can be defined as an extension of the existing Nnef/udm_ParameterProvision services. For example, the existing Nnef/udm_ParameterProvision services can be updated to include group identifiers and to support other data management operations, such as read/get.

In some embodiments, the Group Data Management (GDM) service between NFs and UDM can be based on similar communication patterns as in the Nudm_SDM service. For example, UDM can provide a Nudm_GDM service for NFs to proactively retrieve subscription information related to a group of UEs from UDM at any time. As such, an NF can use this service upon registration of a UE for which individual subscription data indicates that the UE belongs to a particular group ID.

Alternatively, an NF may request UDM to provide the group data for all groups defined in UDM. In this manner, an NF can store retrieved group data for a particular group and retrain it for future use when UEs belonging to that group register in the NF. The NF can retain the stored group data for as long as necessary and/or desired, even if no UE belonging to the group is registered in the NF. Furthermore, the NF may subscribe in UDM to be notified of updates to the group data info by using Nudm_GDM_Subscribe and Nudm_GDM_Notify service operations.

Figure 11:
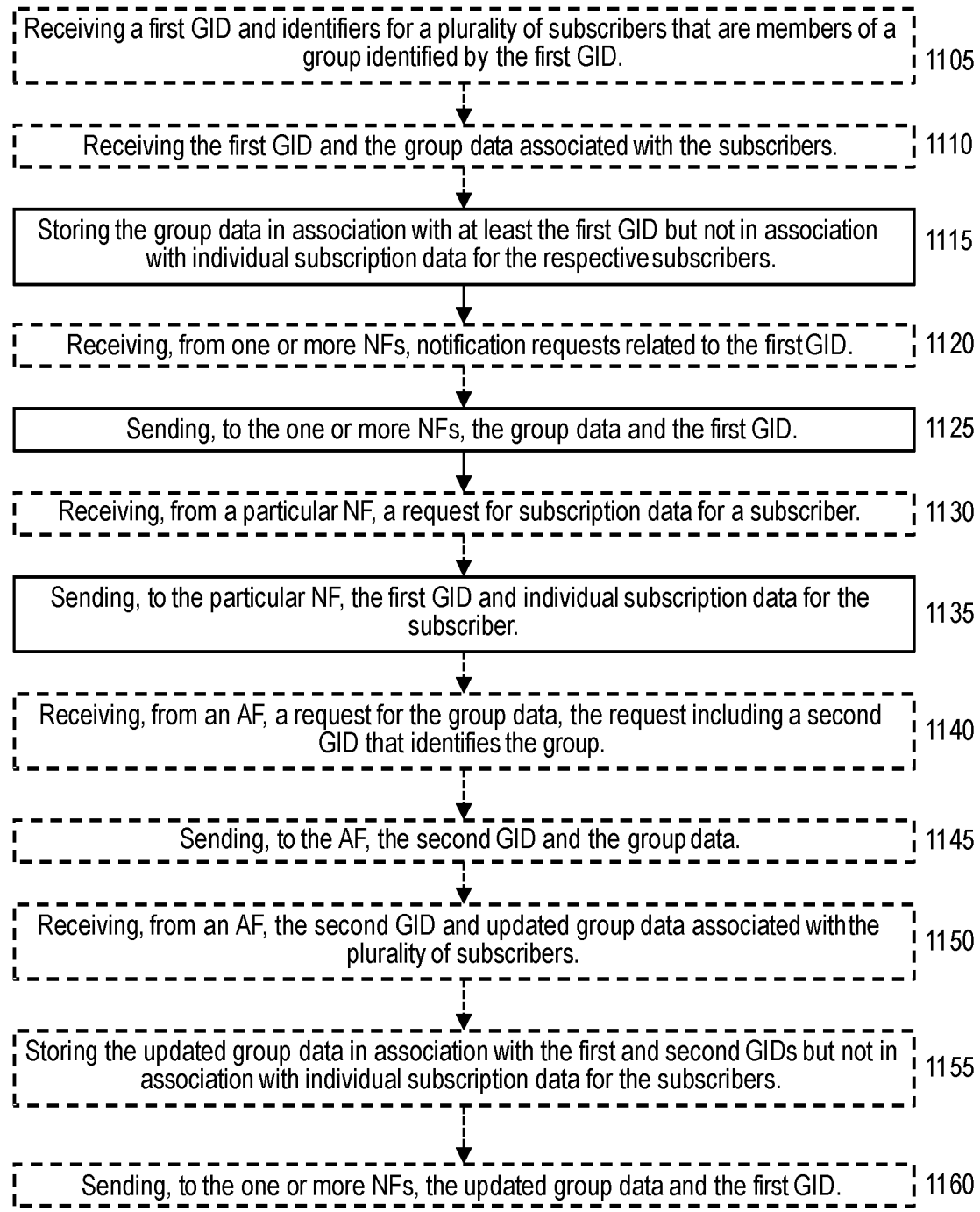
FIGS. 11-12 illustrate exemplary methods and/or procedures for provisioning subscription data, for a plurality of subscribers, to one or more network functions (NFs) in a communication network, according to various exemplary embodiments of the present disclosure.

FIG. 11 illustrates an exemplary method and/or procedure for provisioning subscription data, for a plurality of subscribers, to one or more network functions (NFs) in a communication network, according to various exemplary embodiments of the present disclosure. The exemplary method and/or procedure shown in FIG. 11 can be performed by a data management function and/or node (e.g., by a UDM associated with a UDR), such as described herein with reference to other figures. Although the exemplary method and/or procedure is illustrated in FIG. 11 by blocks in a particular order, this order is exemplary and the operations corresponding to the blocks can be performed in different orders, and can be combined and/or divided into blocks and/or operations having different functionality than shown in FIG. 11. Furthermore, the exemplary method and/or procedure shown in FIG. 11 can be complementary to other exemplary methods and/or procedures disclosed herein, such that they are capable of being used cooperatively to provide the benefits, advantages, and/or solutions to problems described hereinabove. Optional blocks and/or operations are indicated by dashed lines.

In some embodiments, the exemplary method and/or procedure can include the operations of block 1105, where the UDM can receive, from a further NF in the communications network, a first group identifier (GID) and identifiers for a plurality of subscribers that are members of a group identified by the first GID. In this manner, the group ID and its list of members can be provisioned in the UDM. In some embodiments, the exemplary method and/or procedure can include the operations of block 1110, where the UDM can receive, from a further NF, the first GID and the group data associated with the plurality of subscribers. In this manner, the group data can be provisioned in the UDM for the previously provisioned group.

The exemplary method and/or procedure can also include the operations of block 1115, where the UDM can store the group data, related to the plurality of subscribers, in association with at least the first GID, but not in association with individual subscription data for the respective subscribers. In some embodiments, the UDM can store the group data further in association with a second GID. For example, the first GID can be a network-internal GID associated with the group, while the second GID can be an external GID associated with the same group.

In some embodiments, the exemplary method and/or procedure can include the operations of block 1120, where the UDM can receive, from the one or more NFs, respective notification requests related to the first GID. The exemplary method and/or procedure can include the operations of block 1125, where the UDM can send, to the one or more NFs, the group data and the first GID. In such embodiments, the group data and the first GID can be sent in response to the notification requests received in operation 1120.

In some embodiments, the exemplary method and/or procedure can include the operations of block 1130, where the UDM can receive, from a particular NF, a request for subscription data for a particular subscriber. The exemplary method and/or procedure can include the operations of block 1135, where the UDM can send, to the particular NF, the first GID and individual subscription data for the particular subscriber. In such embodiments, the first GID and the individual subscription data can be sent in response to the request for subscription data received in operation 1130.

In some embodiments, the exemplary method and/or procedure can include the operations of block 1140, where the UDM can receive from an an application function (AF) a request for the group data, with the request including the second GID. In such embodiments, the exemplary method and/or procedure can also include the operations of block 1145, where the UDM can send, to the AF, the second GID and the group data.

In some embodiments, the exemplary method and/or procedure can include the operations of block 1150, where the UDM can receive, from an AF, the second GID and updated group data associated with the plurality of subscribers. In such embodiments, the exemplary method and/or procedure can also include the operations of block 1155, where the UDM can store the updated group data in association with the first and second GIDs but not in association with individual subscription data for the respective subscribers. In such embodiments, the exemplary method and/or procedure can also include the operations of block 1160, where the UDM can send, to the one or more NFs, the updated group data and the first GID. In some embodiments, the updated group data and the first GID can be sent in response to respective notification requests from the one or more NFs.

In some embodiments, the communication network can be a 5G core network and the exemplary method and/or procedure can be performed by a UDM, as discussed above. In such embodiments, the one or more NFs can include any of the following: AMF, SMF, UPF, PCF.

Figure 12:
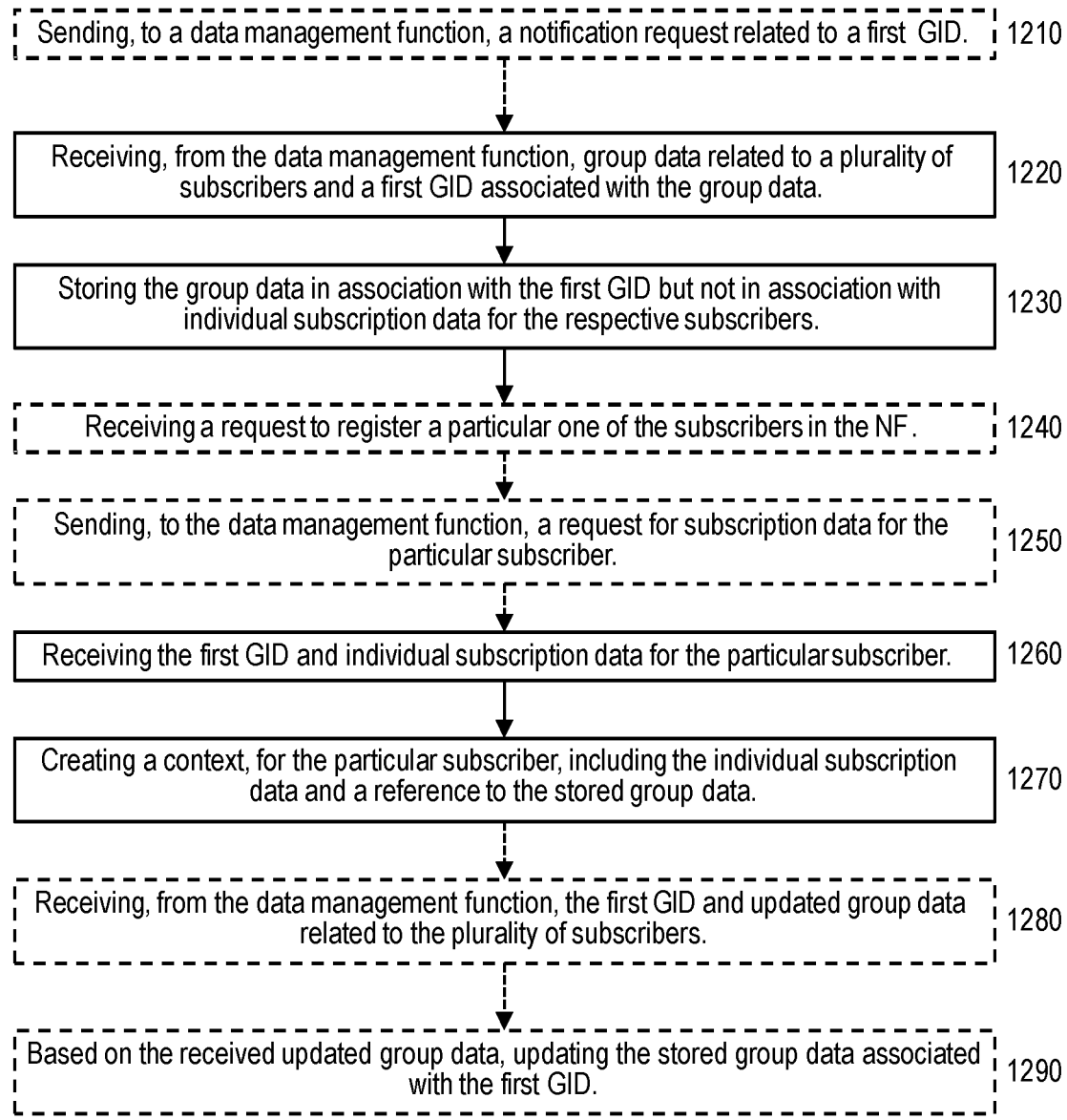

FIG. 12 illustrates another exemplary method and/or procedure for provisioning subscription data, for a plurality of subscribers, to a network function (NF) in a communication network, according to various exemplary embodiments of the present disclosure. The exemplary method and/or procedure shown in FIG. 11 can be performed by a network function and/or node (NF, e.g., AMF, SMF, UPF, PCF, etc.) in a communication network that also includes a data management function (e.g., UDM/UDR), such as described herein with reference to other figures. Although the exemplary method and/or procedure is illustrated in FIG. 12 by blocks in a particular order, this order is exemplary and the operations corresponding to the blocks can be performed in different orders, and can be combined and/or divided into blocks having different functionality than shown in FIG. 12. Furthermore, the exemplary method and/or procedure shown in FIG. 12 can be complementary to other exemplary methods and/or procedures disclosed herein, such that they are capable of being used cooperatively to provide the benefits, advantages, and/or solutions to problems described hereinabove. Optional blocks and/or operations are indicated by dashed lines.

In some embodiments, the exemplary method and/or procedure can include the operations of block 1210, where the NF can send, to the data management function, a notification request related to a first group identifier (GID). The exemplary method and/or procedure can include the operations of block 1220, where the NF can receive, from the data management function, group data related to a plurality of subscribers and the first GID that is associated with the group data. For example, the group data and the first GID can be received in response to the notification request. The exemplary method and/or procedure can include the operations of block 1230, where the NF can store the received group data in association with the first GID but not in association with individual subscription data for the respective subscribers.

In some embodiments, the exemplary method and/or procedure can include the operations of block 1240, where the NF can receive a request to register a particular one of the subscribers in the NF. For example, this request can be received from a different NF in the communications network. In such embodiments, the exemplary method and/or procedure can also include the operations of block 1250, where the NF can send, to the data management function, a request for subscription data for the particular subscriber. The exemplary method and/or procedure can also include the operations of block 1260, where the NF can receive, from the data management function, the first GID and individual subscription data for the particular subscriber. These can be received, for example, in response to the request in operation 1250.

The exemplary method and/or procedure can also include the operations of block 1270, where the NF can create a context, for the particular subscriber, including the individual subscription data and a reference to the stored group data. For example, the reference can be the first GID. In this manner, the group data can be part of the particular subscriber's context without being stored together with the individual subscriber context, but stored in a single location that is referenced by respective contexts for each group member registered in the NF.

In some embodiments, the exemplary method and/or procedure can include the operations of block 1280, where the NF can receive, from the data management function, the first GID and updated group data related to the plurality of subscribers. In such embodiments, the exemplary method and/or procedure can also include the operations of block 1290, where the NF can, based on the received updated group data, update the stored group data associated with the first GID. In such embodiments, after the stored group data is updated in this manner, the contexts for the registered group members reference the updated stored group data. However, it is unnecessary to change the individual contexts themselves, since the first GID included in the individual contexts points to the updated stored group data.

In some embodiments, the communication network can be a 5G core network and the exemplary method and/or procedure can be performed by a NF internal to the 5GC, as discussed above. In such embodiments, the NF can be any of the following: AMF, SMF, UPF, PCF.

Figure 13:
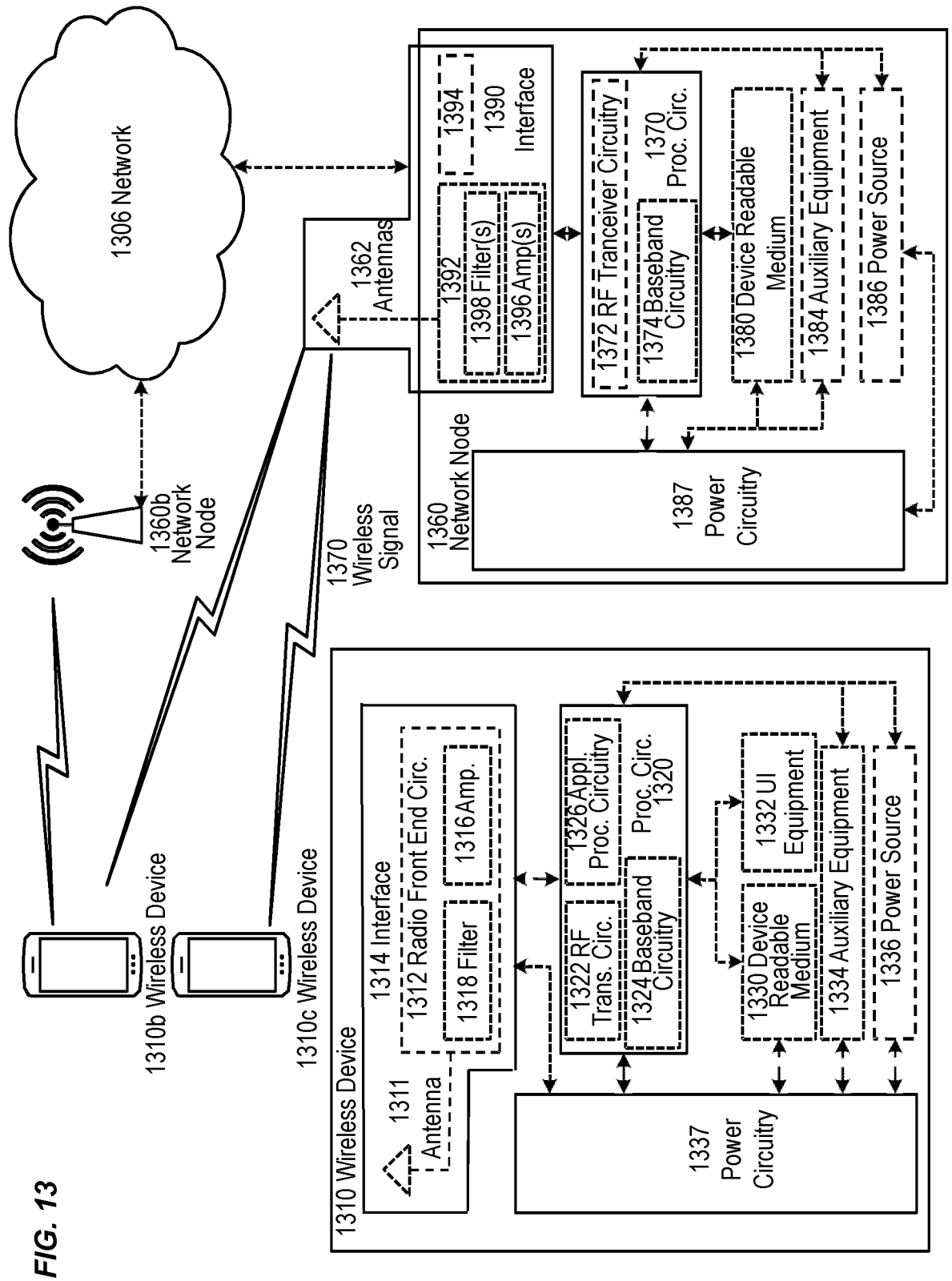
FIG. 13 illustrates an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 13. For simplicity, the wireless network of FIG. 13 only depicts network 1306, network nodes 1360 and 1360b, and WDs 1310, 1310b, and 1310c. In practice, a wireless network can further include any additional elements suitable to support communication between wireless devices or between a wireless device and another communication device, such as a landline telephone, a service provider, or any other network node or end device. Of the illustrated components, network node 1360 and wireless device (WD) 1310 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1306 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1360 and WD 1310 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 13, network node 1360 includes processing circuitry 1370, device readable medium 1380, interface 1390, auxiliary equipment 1384, power source 1386, power circuitry 1387, and antenna 1362. Although network node 1360 illustrated in the example wireless network of FIG. 13 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1360 are depicted as single boxes located within a larger box, or nested within multiple boxes, in practice, a network node can comprise multiple different physical components that make up a single illustrated component (e.g., device readable medium 1380 can comprise multiple separate hard drives as well as multiple RAM modules).

Similarly, network node 1360 can be composed of multiple physically separate components (e.g., a NodeB component and a RNC component, or a BTS component and a BSC component, etc.), which can each have their own respective components. In certain scenarios in which network node 1360 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1360 can be configured to support multiple radio access technologies (RATs). In such embodiments, some components can be duplicated (e.g., separate device readable medium 1380 for the different RATs) and some components can be reused (e.g., the same antenna 1362 can be shared by the RATs). Network node 1360 can also include multiple sets of the various illustrated components for different wireless technologies integrated into network node 1360, such as, for example, GSM, WCDMA, LTE, NR, WiFi, or Bluetooth wireless technologies. These wireless technologies can be integrated into the same or different chip or set of chips and other components within network node 1360.

Processing circuitry 1370 can be configured to perform any determining, calculating, or similar operations (e.g., certain obtaining operations) described herein as being provided by a network node. These operations performed by processing circuitry 1370 can include processing information obtained by processing circuitry 1370 by, for example, converting the obtained information into other information, comparing the obtained information or converted information to information stored in the network node, and/or performing one or more operations based on the obtained information or converted information, and as a result of said processing making a determination.

Processing circuitry 1370 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1360 components, such as device readable medium 1380, network node 1360 functionality. For example, processing circuitry 1370 can execute instructions stored in device readable medium 1380 or in memory within processing circuitry 1370. Such functionality can include providing any of the various wireless features, functions, or benefits discussed herein. In some embodiments, processing circuitry 1370 can include a system on a chip (SOC).

In some embodiments, processing circuitry 1370 can include one or more of radio frequency (RF) transceiver circuitry 1372 and baseband processing circuitry 1374. In some embodiments, radio frequency (RF) transceiver circuitry 1372 and baseband processing circuitry 1374 can be on separate chips (or sets of chips), boards, or units, such as radio units and digital units. In alternative embodiments, part or all of RF transceiver circuitry 1372 and baseband processing circuitry 1374 can be on the same chip or set of chips, boards, or units In certain embodiments, some or all of the functionality described herein as being provided by a network node, base station, eNB or other such network device can be performed by processing circuitry 1370 executing instructions stored on device readable medium 1380 or memory within processing circuitry 1370. In alternative embodiments, some or all of the functionality can be provided by processing circuitry 1370 without executing instructions stored on a separate or discrete device readable medium, such as in a hard-wired manner. In any of those embodiments, whether executing instructions stored on a device readable storage medium or not, processing circuitry 1370 can be configured to perform the described functionality. The benefits provided by such functionality are not limited to processing circuitry 1370 alone or to other components of network node 1360, but are enjoyed by network node 1360 as a whole, and/or by end users and the wireless network generally.

Device readable medium 1380 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1370. Device readable medium 1380 can store any suitable instructions, data or information, including a computer program, software, an application including one or more of logic, rules, code, tables, etc. and/or other instructions capable of being executed by processing circuitry 1370 and, utilized by network node 1360. Device readable medium 1380 can be used to store any calculations made by processing circuitry 1370 and/or any data received via interface 1390. In some embodiments, processing circuitry 1370 and device readable medium 1380 can be considered to be integrated.

Interface 1390 is used in the wired or wireless communication of signalling and/or data between network node 1360, network 1306, and/or WDs 1310. As illustrated, interface 1390 comprises port(s)/terminal(s) 1394 to send and receive data, for example to and from network 1306 over a wired connection. Interface 1390 also includes radio front end circuitry 1392 that can be coupled to, or in certain embodiments a part of, antenna 1362. Radio front end circuitry 1392 comprises filters 1398 and amplifiers 1396. Radio front end circuitry 1392 can be connected to antenna 1362 and processing circuitry 1370. Radio front end circuitry can be configured to condition signals communicated between antenna 1362 and processing circuitry 1370. Radio front end circuitry 1392 can receive digital data that is to be sent out to other network nodes or WDs via a wireless connection. Radio front end circuitry 1392 can convert the digital data into a radio signal having the appropriate channel and bandwidth parameters using a combination of filters 1398 and/or amplifiers 1396. The radio signal can then be transmitted via antenna 1362. Similarly, when receiving data, antenna 1362 can collect radio signals which are then converted into digital data by radio front end circuitry 1392. The digital data can be passed to processing circuitry 1370. In other embodiments, the interface can comprise different components and/or different combinations of components.

In certain alternative embodiments, network node 1360 may not include separate radio front end circuitry 1392, instead, processing circuitry 1370 can comprise radio front end circuitry and can be connected to antenna 1362 without separate radio front end circuitry 1392. Similarly, in some embodiments, all or some of RF transceiver circuitry 1372 can be considered a part of interface 1390. In still other embodiments, interface 1390 can include one or more ports or terminals 1394, radio front end circuitry 1392, and RF transceiver circuitry 1372, as part of a radio unit (not shown), and interface 1390 can communicate with baseband processing circuitry 1374, which is part of a digital unit (not shown).

Antenna 1362 can include one or more antennas, or antenna arrays, configured to send and/or receive wireless signals. Antenna 1362 can be coupled to radio front end circuitry 1390 and can be any type of antenna capable of transmitting and receiving data and/or signals wirelessly. In some embodiments, antenna 1362 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1362 can be separate from network node 1360 and can be connectable to network node 1360 through an interface or port.

Antenna 1362, interface 1390, and/or processing circuitry 1370 can be configured to perform any receiving operations and/or certain obtaining operations described herein as being performed by a network node. Any information, data and/or signals can be received from a wireless device, another network node and/or any other network equipment. Similarly, antenna 1362, interface 1390, and/or processing circuitry 1370 can be configured to perform any transmitting operations described herein as being performed by a network node. Any information, data and/or signals can be transmitted to a wireless device, another network node and/or any other network equipment.

Power circuitry 1387 can comprise, or be coupled to, power management circuitry and can be configured to supply the components of network node 1360 with power for performing the functionality described herein. Power circuitry 1387 can receive power from power source 1386. Power source 1386 and/or power circuitry 1387 can be configured to provide power to the various components of network node 1360 in a form suitable for the respective components (e.g., at a voltage and current level needed for each respective component). Power source 1386 can either be included in, or external to, power circuitry 1387 and/or network node 1360. For example, network node 1360 can be connectable to an external power source (e.g., an electricity outlet) via an input circuitry or interface such as an electrical cable, whereby the external power source supplies power to power circuitry 1387. As a further example, power source 1386 can comprise a source of power in the form of a battery or battery pack which is connected to, or integrated in, power circuitry 1387. The battery can provide backup power should the external power source fail. Other types of power sources, such as photovoltaic devices, can also be used.

Alternative embodiments of network node 1360 can include additional components beyond those shown in FIG. 13 that can be responsible for providing certain aspects of the network node's functionality, including any of the functionality described herein and/or any functionality necessary to support the subject matter described herein. For example, network node 1360 can include user interface equipment to allow and/or facilitate input of information into network node 1360 and to allow and/or facilitate output of information from network node 1360. This can allow and/or facilitate a user to perform diagnostic, maintenance, repair, and other administrative functions for network node 1360.

As used herein, wireless device (WD) refers to a device capable, configured, arranged and/or operable to communicate wirelessly with network nodes and/or other wireless devices. Unless otherwise noted, the term WD can be used interchangeably herein with user equipment (UE). Communicating wirelessly can involve transmitting and/or receiving wireless signals using electromagnetic waves, radio waves, infrared waves, and/or other types of signals suitable for conveying information through air. In some embodiments, a WD can be configured to transmit and/or receive information without direct human interaction. For instance, a WD can be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1310 includes antenna 1311, interface 1314, processing circuitry 1320, device readable medium 1330, user interface equipment 1332, auxiliary equipment 1334, power source 1336 and power circuitry 1337. WD 1310 can include multiple sets of one or more of the illustrated components for different wireless technologies supported by WD 1310, such as, for example, GSM, WCDMA, LTE, NR, WiFi, WiMAX, or Bluetooth wireless technologies, just to mention a few. These wireless technologies can be integrated into the same or different chips or set of chips as other components within WD 1310.

Antenna 1311 can include one or more antennas or antenna arrays, configured to send and/or receive wireless signals, and is connected to interface 1314. In certain alternative embodiments, antenna 1311 can be separate from WD 1310 and be connectable to WD 1310 through an interface or port. Antenna 1311, interface 1314, and/or processing circuitry 1320 can be configured to perform any receiving or transmitting operations described herein as being performed by a WD. Any information, data and/or signals can be received from a network node and/or another WD. In some embodiments, radio front end circuitry and/or antenna 1311 can be considered an interface.

As illustrated, interface 1314 comprises radio front end circuitry 1312 and antenna 1311. Radio front end circuitry 1312 comprise one or more filters 1318 and amplifiers 1316. Radio front end circuitry 1312 is connected to antenna 1311 and processing circuitry 1320, and can be configured to condition signals communicated between antenna 1311 and processing circuitry 1320. Radio front end circuitry 1312 can be coupled to or a part of antenna 1311. In some embodiments, WD 1310 may not include separate radio front end circuitry 1312; rather, processing circuitry 1320 can comprise radio front end circuitry and can be connected to antenna 1311. Similarly, in some embodiments, some or all of RF transceiver circuitry 1322 can be considered a part of interface 1314. Radio front end circuitry 1312 can receive digital data that is to be sent out to other network nodes or WDs via a wireless connection. Radio front end circuitry 1312 can convert the digital data into a radio signal having the appropriate channel and bandwidth parameters using a combination of filters 1318 and/or amplifiers 1316. The radio signal can then be transmitted via antenna 1311. Similarly, when receiving data, antenna 1311 can collect radio signals which are then converted into digital data by radio front end circuitry 1312. The digital data can be passed to processing circuitry 1320. In other embodiments, the interface can comprise different components and/or different combinations of components.

Processing circuitry 1320 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1310 components, such as device readable medium 1330, WD 1310 functionality. Such functionality can include providing any of the various wireless features or benefits discussed herein. For example, processing circuitry 1320 can execute instructions stored in device readable medium 1330 or in memory within processing circuitry 1320 to provide the functionality disclosed herein.

As illustrated, processing circuitry 1320 includes one or more of RF transceiver circuitry 1322, baseband processing circuitry 1324, and application processing circuitry 1326. In other embodiments, the processing circuitry can comprise different components and/or different combinations of components. In certain embodiments processing circuitry 1320 of WD 1310 can comprise a SOC. In some embodiments, RF transceiver circuitry 1322, baseband processing circuitry 1324, and application processing circuitry 1326 can be on separate chips or sets of chips. In alternative embodiments, part or all of baseband processing circuitry 1324 and application processing circuitry 1326 can be combined into one chip or set of chips, and RF transceiver circuitry 1322 can be on a separate chip or set of chips. In still alternative embodiments, part or all of RF transceiver circuitry 1322 and baseband processing circuitry 1324 can be on the same chip or set of chips, and application processing circuitry 1326 can be on a separate chip or set of chips. In yet other alternative embodiments, part or all of RF transceiver circuitry 1322, baseband processing circuitry 1324, and application processing circuitry 1326 can be combined in the same chip or set of chips. In some embodiments, RF transceiver circuitry 1322 can be a part of interface 1314. RF transceiver circuitry 1322 can condition RF signals for processing circuitry 1320.

In certain embodiments, some or all of the functionality described herein as being performed by a WD can be provided by processing circuitry 1320 executing instructions stored on device readable medium 1330, which in certain embodiments can be a computer-readable storage medium. In alternative embodiments, some or all of the functionality can be provided by processing circuitry 1320 without executing instructions stored on a separate or discrete device readable storage medium, such as in a hard-wired manner. In any of those particular embodiments, whether executing instructions stored on a device readable storage medium or not, processing circuitry 1320 can be configured to perform the described functionality. The benefits provided by such functionality are not limited to processing circuitry 1320 alone or to other components of WD 1310, but are enjoyed by WD 1310 as a whole, and/or by end users and the wireless network generally.

Processing circuitry 1320 can be configured to perform any determining, calculating, or similar operations (e.g., certain obtaining operations) described herein as being performed by a WD. These operations, as performed by processing circuitry 1320, can include processing information obtained by processing circuitry 1320 by, for example, converting the obtained information into other information, comparing the obtained information or converted information to information stored by WD 1310, and/or performing one or more operations based on the obtained information or converted information, and as a result of said processing making a determination.

Device readable medium 1330 can be operable to store a computer program, software, an application including one or more of logic, rules, code, tables, etc. and/or other instructions capable of being executed by processing circuitry 1320. Device readable medium 1330 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1320. In some embodiments, processing circuitry 1320 and device readable medium 1330 can be considered to be integrated.

User interface equipment 1332 can include components that allow and/or facilitate a human user to interact with WD 1310. Such interaction can be of many forms, such as visual, audial, tactile, etc. User interface equipment 1332 can be operable to produce output to the user and to allow and/or facilitate the user to provide input to WD 1310. The type of interaction can vary depending on the type of user interface equipment 1332 installed in WD 1310. For example, if WD 1310 is a smart phone, the interaction can be via a touch screen; if WD 1310 is a smart meter, the interaction can be through a screen that provides usage (e.g., the number of gallons used) or a speaker that provides an audible alert (e.g., if smoke is detected). User interface equipment 1332 can include input interfaces, devices and circuits, and output interfaces, devices and circuits. User interface equipment 1332 can be configured to allow and/or facilitate input of information into WD 1310, and is connected to processing circuitry 1320 to allow and/or facilitate processing circuitry 1320 to process the input information. User interface equipment 1332 can include, for example, a microphone, a proximity or other sensor, keys/buttons, a touch display, one or more cameras, a USB port, or other input circuitry. User interface equipment 1332 is also configured to allow and/or facilitate output of information from WD 1310, and to allow and/or facilitate processing circuitry 1320 to output information from WD 1310. User interface equipment 1332 can include, for example, a speaker, a display, vibrating circuitry, a USB port, a headphone interface, or other output circuitry. Using one or more input and output interfaces, devices, and circuits, of user interface equipment 1332, WD 1310 can communicate with end users and/or the wireless network, and allow and/or facilitate them to benefit from the functionality described herein.

Auxiliary equipment 1334 is operable to provide more specific functionality which may not be generally performed by WDs. This can comprise specialized sensors for doing measurements for various purposes, interfaces for additional types of communication such as wired communications etc. The inclusion and type of components of auxiliary equipment 1334 can vary depending on the embodiment and/or scenario.

Power source 1336 can, in some embodiments, be in the form of a battery or battery pack. Other types of power sources, such as an external power source (e.g., an electricity outlet), photovoltaic devices or power cells, can also be used. WD 1310 can further comprise power circuitry 1337 for delivering power from power source 1336 to the various parts of WD 1310 which need power from power source 1336 to carry out any functionality described or indicated herein. Power circuitry 1337 can in certain embodiments comprise power management circuitry. Power circuitry 1337 can additionally or alternatively be operable to receive power from an external power source; in which case WD 1310 can be connectable to the external power source (such as an electricity outlet) via input circuitry or an interface such as an electrical power cable. Power circuitry 1337 can also in certain embodiments be operable to deliver power from an external power source to power source 1336. This can be, for example, for the charging of power source 1336. Power circuitry 1337 can perform any converting or other modification to the power from power source 1336 to make it suitable for supply to the respective components of WD 1310.

Figure 14:
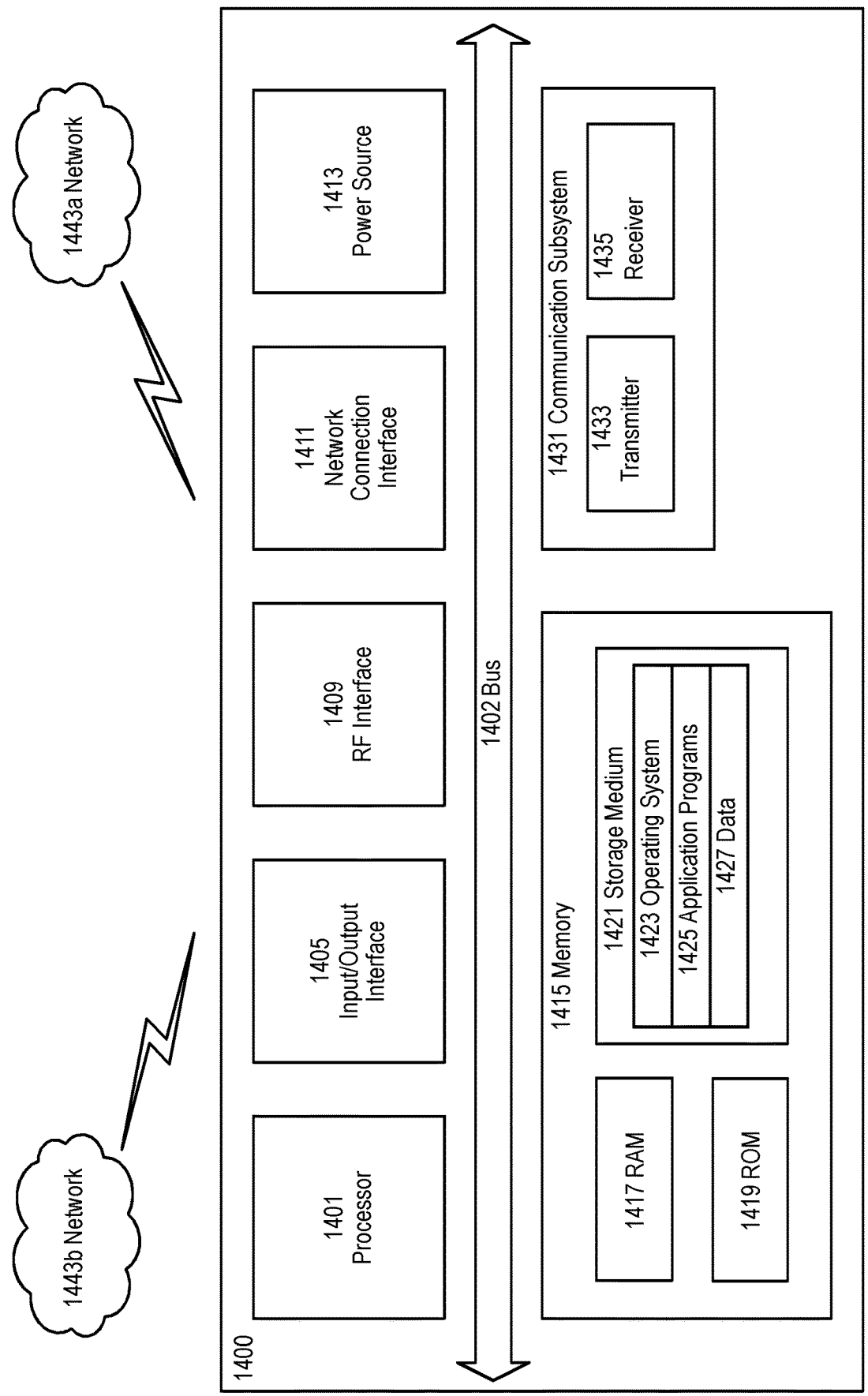
FIG. 14 illustrates an exemplary embodiment of a UE, in accordance with various aspects described herein.

FIG. 14 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 1400 can be any UE identified by the $3^{rd}$ Generation Partnership Project (3GPP), including a NB-IoT UE, a machine type communication (MTC) UE, and/or an enhanced MTC (eMTC) UE. UE 1400, as illustrated in FIG. 14, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 14 is a UE, the components discussed herein are equally applicable to a WD, and vice-versa.

In FIG. 14, UE 1400 includes processing circuitry 1401 that is operatively coupled to input/output interface 1405, radio frequency (RF) interface 1409, network connection interface 1411, memory 1415 including random access memory (RAM) 1417, read-only memory (ROM) 1419, and storage medium 1421 or the like, communication subsystem 1431, power source 1413, and/or any other component, or any combination thereof. Storage medium 1421 includes operating system 1423, application program 1425, and data 1427. In other embodiments, storage medium 1421 can include other similar types of information. Certain UEs can utilize all of the components shown in FIG. 14, or only a subset of the components. The level of integration between the components can vary from one UE to another UE. Further, certain UEs can contain multiple instances of a component, such as multiple processors, memories, transceivers, transmitters, receivers, etc.

In FIG. 14, processing circuitry 1401 can be configured to process computer instructions and data. Processing circuitry 1401 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1401 can include two central processing units (CPUs). Data can be information in a form suitable for use by a computer.

In the depicted embodiment, input/output interface 1405 can be configured to provide a communication interface to an input device, output device, or input and output device. UE 1400 can be configured to use an output device via input/output interface 1405. An output device can use the same type of interface port as an input device. For example, a USB port can be used to provide input to and output from UE 1400. The output device can be a speaker, a sound card, a video card, a display, a monitor, a printer, an actuator, an emitter, a smartcard, another output device, or any combination thereof. UE 1400 can be configured to use an input device via input/output interface 1405 to allow and/or facilitate a user to capture information into UE 1400. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 14, RF interface 1409 can be configured to provide a communication interface to RF components such as a transmitter, a receiver, and an antenna. Network connection interface 1411 can be configured to provide a communication interface to network 1443*a*. Network 1443*a* can encompass wired and/or wireless networks such as a local-area network (LAN), a wide-area network (WAN), a computer network, a wireless network, a telecommunications network, another like network or any combination thereof. For example, network 1443*a* can comprise a Wi-Fi network. Network connection interface 1411 can be configured to include a receiver and a transmitter interface used to communicate with one or more other devices over a communication network according to one or more communication protocols, such as Ethernet, TCP/IP, SONET, ATM, or the like. Network connection interface 1411 can implement receiver and transmitter functionality appropriate to the communication network links (e.g., optical, electrical, and the like). The transmitter and receiver functions can share circuit components, software or firmware, or alternatively can be implemented separately.

RAM 1417 can be configured to interface via bus 1402 to processing circuitry 1401 to provide storage or caching of data or computer instructions during the execution of software programs such as the operating system, application programs, and device drivers. ROM 1419 can be configured to provide computer instructions or data to processing circuitry 1401. For example, ROM 1419 can be configured to store invariant low-level system code or data for basic system functions such as basic input and output (I/O), startup, or reception of keystrokes from a keyboard that are stored in a non-volatile memory. Storage medium 1421 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1421 can be configured to include operating system 1423, application program 1425 such as a web browser application, a widget or gadget engine or another application, and data file 1427. Storage medium 1421 can store, for use by UE 1400, any of a variety of various operating systems or combinations of operating systems.

Storage medium 1421 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1421 can allow and/or facilitate UE 1400 to access computer-executable instructions, application programs or the like, stored on transitory or non-transitory memory media, to off-load data, or to upload data. An article of manufacture, such as one utilizing a communication system can be tangibly embodied in storage medium 1421, which can comprise a device readable medium.

In FIG. 14, processing circuitry 1401 can be configured to communicate with network 1443*b* using communication subsystem 1431. Network 1443*a* and network 1443*b* can be the same network or networks or different network or networks. Communication subsystem 1431 can be configured to include one or more transceivers used to communicate with network 1443*b*. For example, communication subsystem 1431 can be configured to include one or more transceivers used to communicate with one or more remote transceivers of another device capable of wireless communication such as another WD, UE, or base station of a radio access network (RAN) according to one or more communication protocols, such as IEEE 802.14, CDMA, WCDMA, GSM, LTE, UTRAN, WiMax, or the like. Each transceiver can include transmitter 1433 and/or receiver 1435 to implement transmitter or receiver functionality, respectively, appropriate to the RAN links (e.g., frequency allocations and the like). Further, transmitter 1433 and receiver 1435 of each transceiver can share circuit components, software or firmware, or alternatively can be implemented separately.

In the illustrated embodiment, the communication functions of communication subsystem 1431 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1431 can include cellular communication, Wi-Fi communication, Bluetooth communication, and GPS communication. Network 1443*b* can encompass wired and/or wireless networks such as a local-area network (LAN), a wide-area network (WAN), a computer network, a wireless network, a telecommunications network, another like network or any combination thereof. For example, network 1443*b* can be a cellular network, a Wi-Fi network, and/or a near-field network. Power source 1413 can be configured to provide alternating current (AC) or direct current (DC) power to components of UE 1400.

The features, benefits and/or functions described herein can be implemented in one of the components of UE 1400 or partitioned across multiple components of UE 1400. Further, the features, benefits, and/or functions described herein can be implemented in any combination of hardware, software or firmware. In one example, communication subsystem 1431 can be configured to include any of the components described herein. Further, processing circuitry 1401 can be configured to communicate with any of such components over bus 1402. In another example, any of such components can be represented by program instructions stored in memory that when executed by processing circuitry 1401 perform the corresponding functions described herein. In another example, the functionality of any of such components can be partitioned between processing circuitry 1401 and communication subsystem 1431. In another example, the non-computationally intensive functions of any of such components can be implemented in software or firmware and the computationally intensive functions can be implemented in hardware.

Figure 15:
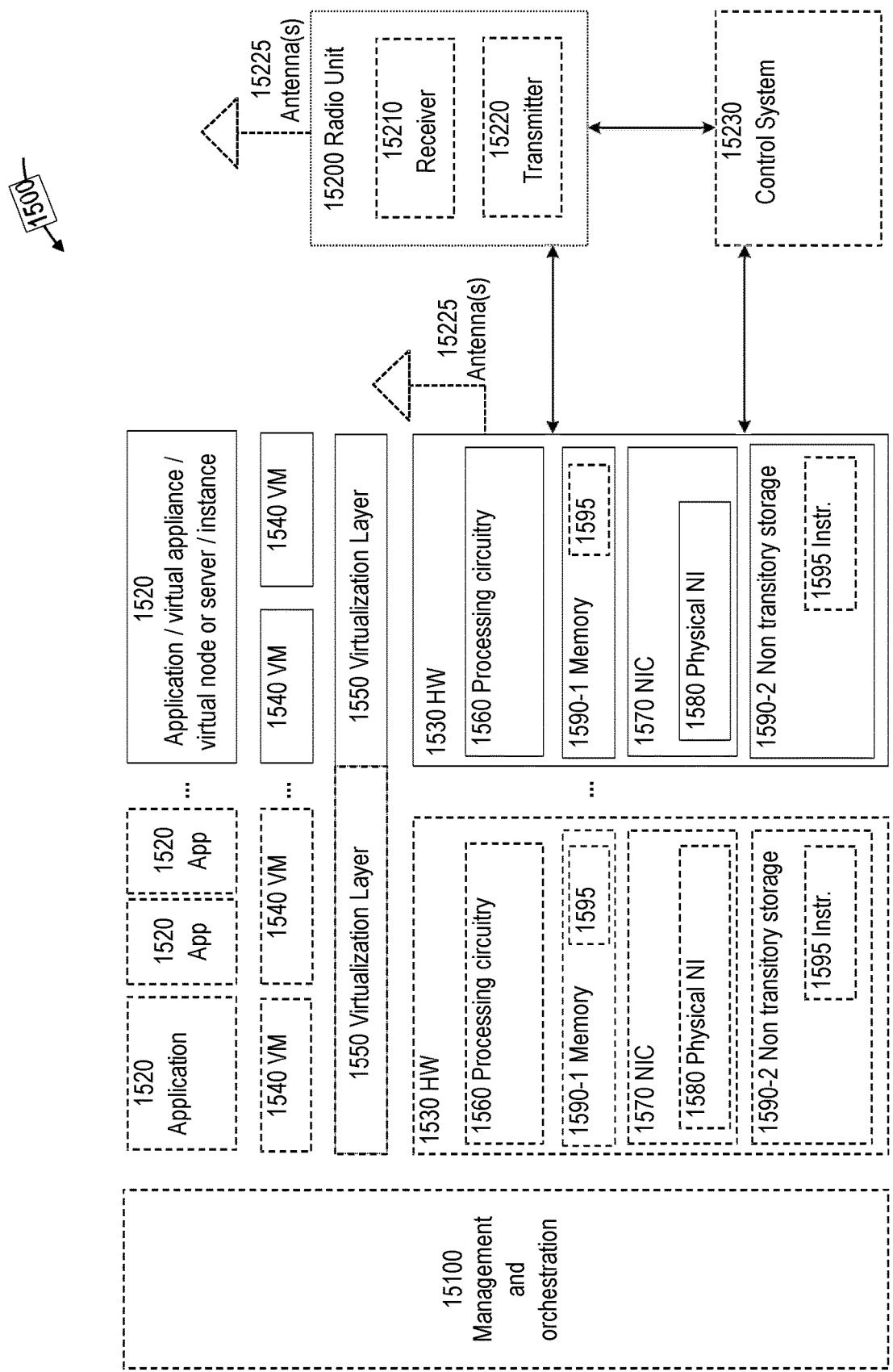
FIG. 15 is a block diagram illustrating an exemplary virtualization environment usable for implementation of various embodiments of network nodes described herein.

FIG. 15 is a schematic block diagram illustrating a virtualization environment 1500 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1500 hosted by one or more of hardware nodes 1530. Further, in embodiments in which the virtual node is not a radio access node or does not require radio connectivity (e.g., a core network node), then the network node can be entirely virtualized.

The functions can be implemented by one or more applications 1520 (which can alternatively be called software instances, virtual appliances, network functions, virtual nodes, virtual network functions, etc.) operative to implement some of the features, functions, and/or benefits of some of the embodiments disclosed herein. Applications 1520 are run in virtualization environment 1500 which provides hardware 1530 comprising processing circuitry 1560 and memory 1590. Memory 1590 contains instructions 1595 executable by processing circuitry 1560 whereby application 1520 is operative to provide one or more of the features, benefits, and/or functions disclosed herein.

Virtualization environment 1500, comprises general-purpose or special-purpose network hardware devices 1530 comprising a set of one or more processors or processing circuitry 1560, which can be commercial off-the-shelf (COTS) processors, dedicated Application Specific Integrated Circuits (ASICs), or any other type of processing circuitry including digital or analog hardware components or special purpose processors. Each hardware device can comprise memory 1590-1 which can be non-persistent memory for temporarily storing instructions 1595 or software executed by processing circuitry 1560. Each hardware device can comprise one or more network interface controllers (NICs) 1570, also known as network interface cards, which include physical network interface 1580. Each hardware device can also include non-transitory, persistent, machine-readable storage media 1590-2 having stored therein software 1595 and/or instructions executable by processing circuitry 1560. Software 1595 can include any type of software including software for instantiating one or more virtualization layers 1550 (also referred to as hypervisors), software to execute virtual machines 1540 as well as software allowing it to execute functions, features and/or benefits described in relation with some embodiments described herein.

Virtual machines 1540, comprise virtual processing, virtual memory, virtual networking or interface and virtual storage, and can be run by a corresponding virtualization layer 1550 or hypervisor. Different embodiments of the instance of virtual appliance 1520 can be implemented on one or more of virtual machines 1540, and the implementations can be made in different ways.

During operation, processing circuitry 1560 executes software 1595 to instantiate the hypervisor or virtualization layer 1550, which can sometimes be referred to as a virtual machine monitor (VMM). Virtualization layer 1550 can present a virtual operating platform that appears like networking hardware to virtual machine 1540.

As shown in FIG. 15, hardware 1530 can be a standalone network node with generic or specific components. Hardware 1530 can comprise antenna 15225 and can implement some functions via virtualization. Alternatively, hardware 1530 can be part of a larger cluster of hardware (e.g., such as in a data center or customer premise equipment (CPE)) where many hardware nodes work together and are managed via management and orchestration (MANO) 15100, which, among others, oversees lifecycle management of applications 1520.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1540 can be a software implementation of a physical machine that runs programs as if they were executing on a physical, non-virtualized machine. Each of virtual machines 1540, and that part of hardware 1530 that executes that virtual machine, be it hardware dedicated to that virtual machine and/or hardware shared by that virtual machine with others of the virtual machines 1540, forms a separate virtual network elements (VNE).

Still in the context of NFV, Virtual Network Function (VNF) is responsible for handling specific network functions that run in one or more virtual machines 1540 on top of hardware networking infrastructure 1530 and corresponds to application 1520 in FIG. 15.

In some embodiments, one or more radio units 15200 that each include one or more transmitters 15220 and one or more receivers 15210 can be coupled to one or more antennas 15225. Radio units 15200 can communicate directly with hardware nodes 1530 via one or more appropriate network interfaces and can be used in combination with the virtual components to provide a virtual node with radio capabilities, such as a radio access node or a base station.

In some embodiments, some signalling can be effected with the use of control system 15230 which can alternatively be used for communication between the hardware nodes 1530 and radio units 15200.

Figure 16:
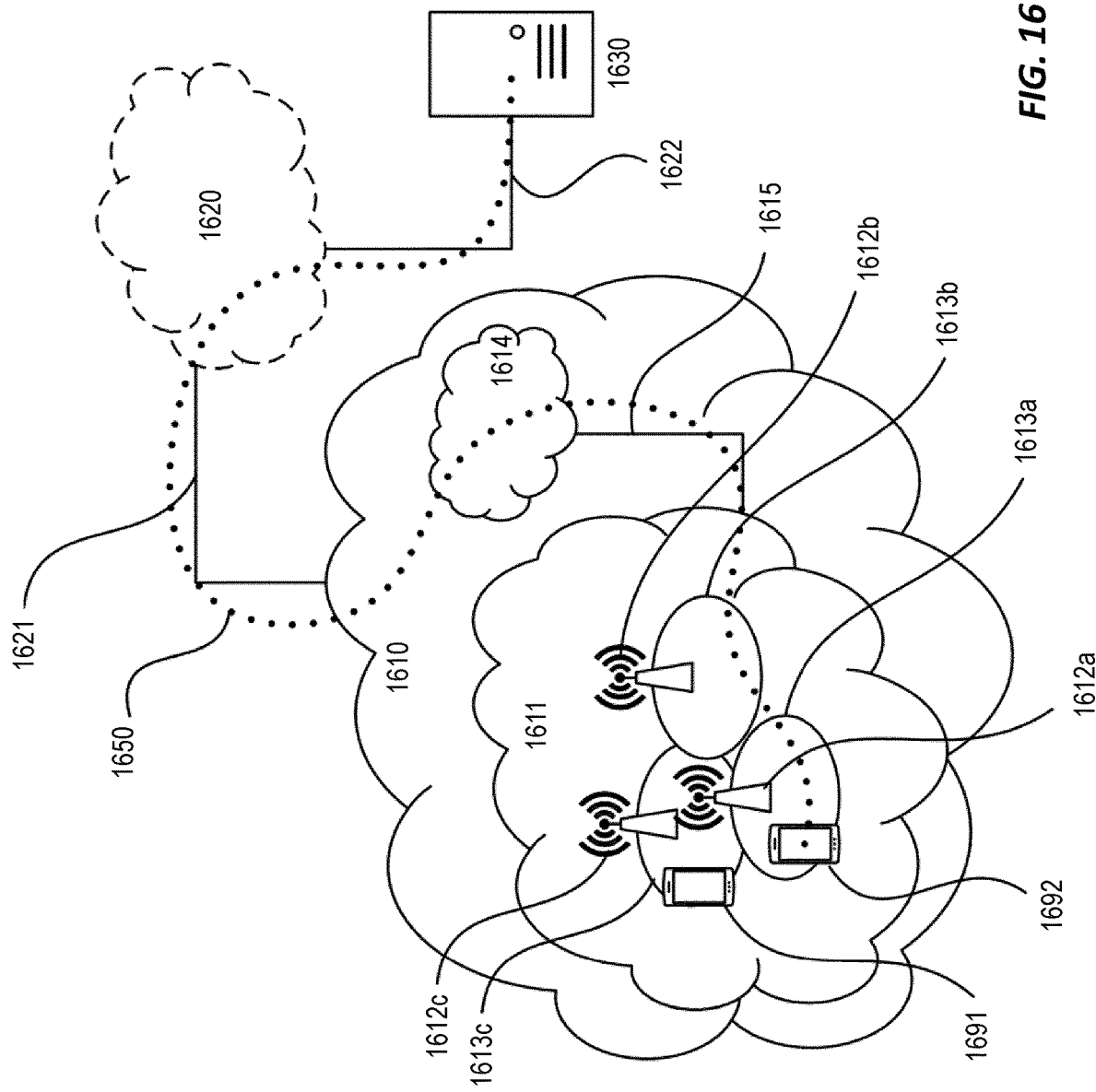
FIGS. 16-17 are block diagrams of various exemplary communication systems and/or networks, in accordance with various aspects described herein.

With reference to FIG. 16, in accordance with an embodiment, a communication system includes telecommunication network 1610, such as a 3GPP-type cellular network, which comprises access network 1611, such as a radio access network, and core network 1614. Access network 1611 comprises a plurality of base stations 1612*a*, 1612*b*, 1612*c*, such as NBs, eNBs, gNBs or other types of wireless access points, each defining a corresponding coverage area 1613*a*, 1613*b*, 1613*c*. Each base station 1612*a*, 1612*b*, 1612*c* is connectable to core network 1614 over a wired or wireless connection 1615. A first UE 1691 located in coverage area 1613*c* can be configured to wirelessly connect to, or be paged by, the corresponding base station 1612*c*. A second UE 1692 in coverage area 1613*a* is wirelessly connectable to the corresponding base station 1612*a*. While a plurality of UEs 1691, 1692 are illustrated in this example, the disclosed embodiments are equally applicable to a situation where a sole UE is in the coverage area or where a sole UE is connecting to the base station.

Telecommunication network 1610 is itself connected to host computer 1630, which can be embodied in the hardware and/or software of a standalone server, a cloud-implemented server, a distributed server or as processing resources in a server farm. Host computer 1630 can be under the ownership or control of a service provider, or can be operated by the service provider or on behalf of the service provider. Connections 1621 and 1622 between telecommunication network 1610 and host computer 1630 can extend directly from core network 1614 to host computer 1630 or can go via an optional intermediate network 1620. Intermediate network 1620 can be one of, or a combination of more than one of, a public, private or hosted network; intermediate network 1620, if any, can be a backbone network or the Internet; in particular, intermediate network 1620 can comprise two or more sub-networks (not shown).

The communication system of FIG. 16 as a whole enables connectivity between the connected UEs 1691, 1692 and host computer 1630. The connectivity can be described as an over-the-top (OTT) connection 1650. Host computer 1630 and the connected UEs 1691, 1692 are configured to communicate data and/or signaling via OTT connection 1650, using access network 1611, core network 1614, any intermediate network 1620 and possible further infrastructure (not shown) as intermediaries. OTT connection 1650 can be transparent in the sense that the participating communication devices through which OTT connection 1650 passes are unaware of routing of uplink and downlink communications. For example, base station 1612 may not or need not be informed about the past routing of an incoming downlink communication with data originating from host computer 1630 to be forwarded (e.g., handed over) to a connected UE 1691. Similarly, base station 1612 need not be aware of the future routing of an outgoing uplink communication originating from the UE 1691 towards the host computer 1630.

Example implementations, in accordance with an embodiment, of the UE, base station and host computer discussed in the preceding paragraphs will now be described with reference to FIG. 17. In communication system 1700, host computer 1710 comprises hardware 1715 including communication interface 1716 configured to set up and maintain a wired or wireless connection with an interface of a different communication device of communication system 1700. Host computer 1710 further comprises processing circuitry 1718, which can have storage and/or processing capabilities. In particular, processing circuitry 1718 can comprise one or more programmable processors, application-specific integrated circuits, field programmable gate arrays or combinations of these (not shown) adapted to execute instructions. Host computer 1710 further comprises software 1711, which is stored in or accessible by host computer 1710 and executable by processing circuitry 1718. Software 1711 includes host application 1712. Host application 1712 can be operable to provide a service to a remote user, such as UE 1730 connecting via OTT connection 1750 terminating at UE 1730 and host computer 1710. In providing the service to the remote user, host application 1712 can provide user data which is transmitted using OTT connection 1750.

Communication system 1700 can also include base station 1720 provided in a telecommunication system and comprising hardware 1725 enabling it to communicate with host computer 1710 and with UE 1730. Hardware 1725 can include communication interface 1726 for setting up and maintaining a wired or wireless connection with an interface of a different communication device of communication system 1700, as well as radio interface 1727 for setting up and maintaining at least wireless connection 1770 with UE 1730 located in a coverage area (not shown in FIG. 17) served by base station 1720. Communication interface 1726 can be configured to facilitate connection 1760 to host computer 1710. Connection 1760 can be direct or it can pass through a core network (not shown in FIG. 17) of the telecommunication system and/or through one or more intermediate networks outside the telecommunication system. In the embodiment shown, hardware 1725 of base station 1720 can also include processing circuitry 1728, which can comprise one or more programmable processors, application-specific integrated circuits, field programmable gate arrays or combinations of these (not shown) adapted to execute instructions. Base station 1720 further has software 1721 stored internally or accessible via an external connection.

Communication system 1700 can also include UE 1730 already referred to. Its hardware 1735 can include radio interface 1737 configured to set up and maintain wireless connection 1770 with a base station serving a coverage area in which UE 1730 is currently located.

Hardware 1735 of UE 1730 can also include processing circuitry 1738, which can comprise one or more programmable processors, application-specific integrated circuits, field programmable gate arrays or combinations of these (not shown) adapted to execute instructions. UE 1730 further comprises software 1731, which is stored in or accessible by UE 1730 and executable by processing circuitry 1738. Software 1731 includes client application 1732. Client application 1732 can be operable to provide a service to a human or non-human user via UE 1730, with the support of host computer 1710. In host computer 1710, an executing host application 1712 can communicate with the executing client application 1732 via OTT connection 1750 terminating at UE 1730 and host computer 1710. In providing the service to the user, client application 1732 can receive request data from host application 1712 and provide user data in response to the request data. OTT connection 1750 can transfer both the request data and the user data. Client application 1732 can interact with the user to generate the user data that it provides.

Figure 17:
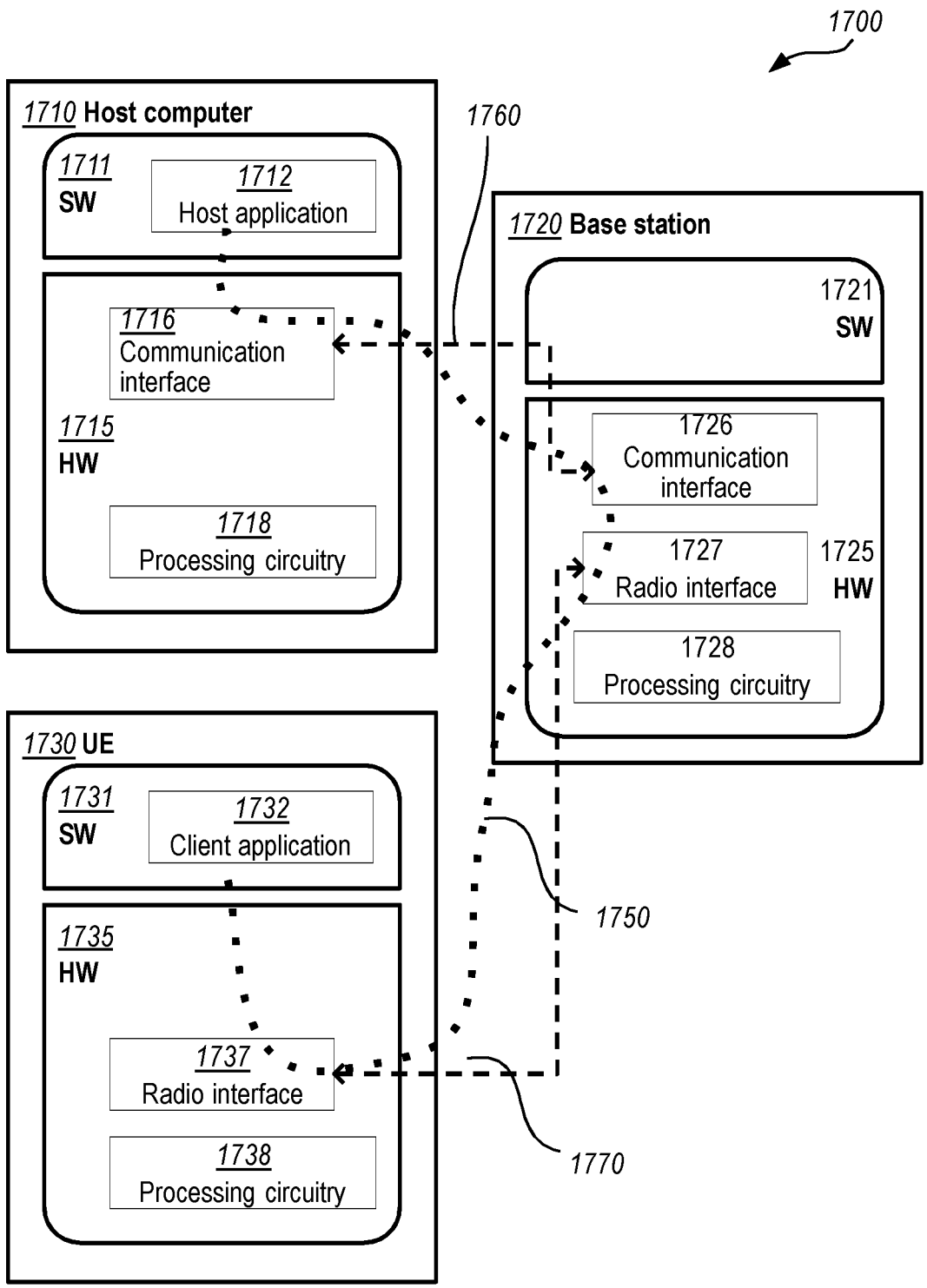

It is noted that host computer 1710, base station 1720 and UE 1730 illustrated in FIG. 17 can be similar or identical to host computer 1630, one of base stations 1612a, 1612b, 1612c and one of UEs 1691, 1692 of FIG. 16, respectively. This is to say, the inner workings of these entities can be as shown in FIG. 17 and independently, the surrounding network topology can be that of FIG. 16.

In FIG. 17, OTT connection 1750 has been drawn abstractly to illustrate the communication between host computer 1710 and UE 1730 via base station 1720, without explicit reference to any intermediary devices and the precise routing of messages via these devices. Network infrastructure can determine the routing, which it can be configured to hide from UE 1730 or from the service provider operating host computer 1710, or both. While OTT connection 1750 is active, the network infrastructure can further take decisions by which it dynamically changes the routing (e.g., on the basis of load balancing consideration or reconfiguration of the network).

Wireless connection 1770 between UE 1730 and base station 1720 is in accordance with the teachings of the embodiments described throughout this disclosure. One or more of the various embodiments improve the performance of OTT services provided to UE 1730 using OTT connection 1750, in which wireless connection 1770 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1750 between host computer 1710 and UE 1730, in response to variations in the measurement results. The measurement procedure and/or the network functionality for reconfiguring OTT connection 1750 can be implemented in software 1711 and hardware 1715 of host computer 1710 or in software 1731 and hardware 1735 of UE 1730, or both. In embodiments, sensors (not shown) can be deployed in or in association with communication devices through which OTT connection 1750 passes; the sensors can participate in the measurement procedure by supplying values of the monitored quantities exemplified above, or supplying values of other physical quantities from which software 1711, 1731 can compute or estimate the monitored quantities. The reconfiguring of OTT connection 1750 can include message format, retransmission settings, preferred routing etc.; the reconfiguring need not affect base station 1720, and it can be unknown or imperceptible to base station 1720. Such procedures and functionalities can be known and practiced in the art. In certain embodiments, measurements can involve proprietary UE signaling facilitating host computer 1710's measurements of throughput, propagation times, latency and the like. The measurements can be implemented in that software 1711 and 1731 causes messages to be transmitted, in particular empty or 'dummy' messages, using OTT connection 1750 while it monitors propagation times, errors etc.

FIG. 18 is a flowchart illustrating an exemplary method and/or procedure implemented in a communication system, in accordance with one embodiment. The communication system includes a host computer, a base station and a UE which, in some exemplary embodiments, can be those described with reference to FIGS. 16 and 17. For simplicity of the present disclosure, only drawing references to FIG. 18 will be included in this section. In step 1810, the host computer provides user data. In substep 1811 (which can be optional) of step 1810, the host computer provides the user data by executing a host application. In step 1820, the host computer initiates a transmission carrying the user data to the UE. In step 1830 (which can be optional), the base station transmits to the UE the user data which was carried in the transmission that the host computer initiated, in accordance with the teachings of the embodiments described throughout this disclosure. In step 1840 (which can also be optional), the UE executes a client application associated with the host application executed by the host computer.

FIG. 19 is a flowchart illustrating an exemplary method and/or procedure implemented in a communication system, in accordance with one embodiment. The communication system includes a host computer, a base station and a UE which can be those described with reference to FIGS. 16 and 17. For simplicity of the present disclosure, only drawing references to FIG. 19 will be included in this section. In step 1910 of the method, the host computer provides user data. In an optional substep (not shown) the host computer provides the user data by executing a host application. In step 1920, the host computer initiates a transmission carrying the user data to the UE. The transmission can pass via the base station, in accordance with the teachings of the embodiments described throughout this disclosure. In step 1930 (which can be optional), the UE receives the user data carried in the transmission.

Figures 20, 21:
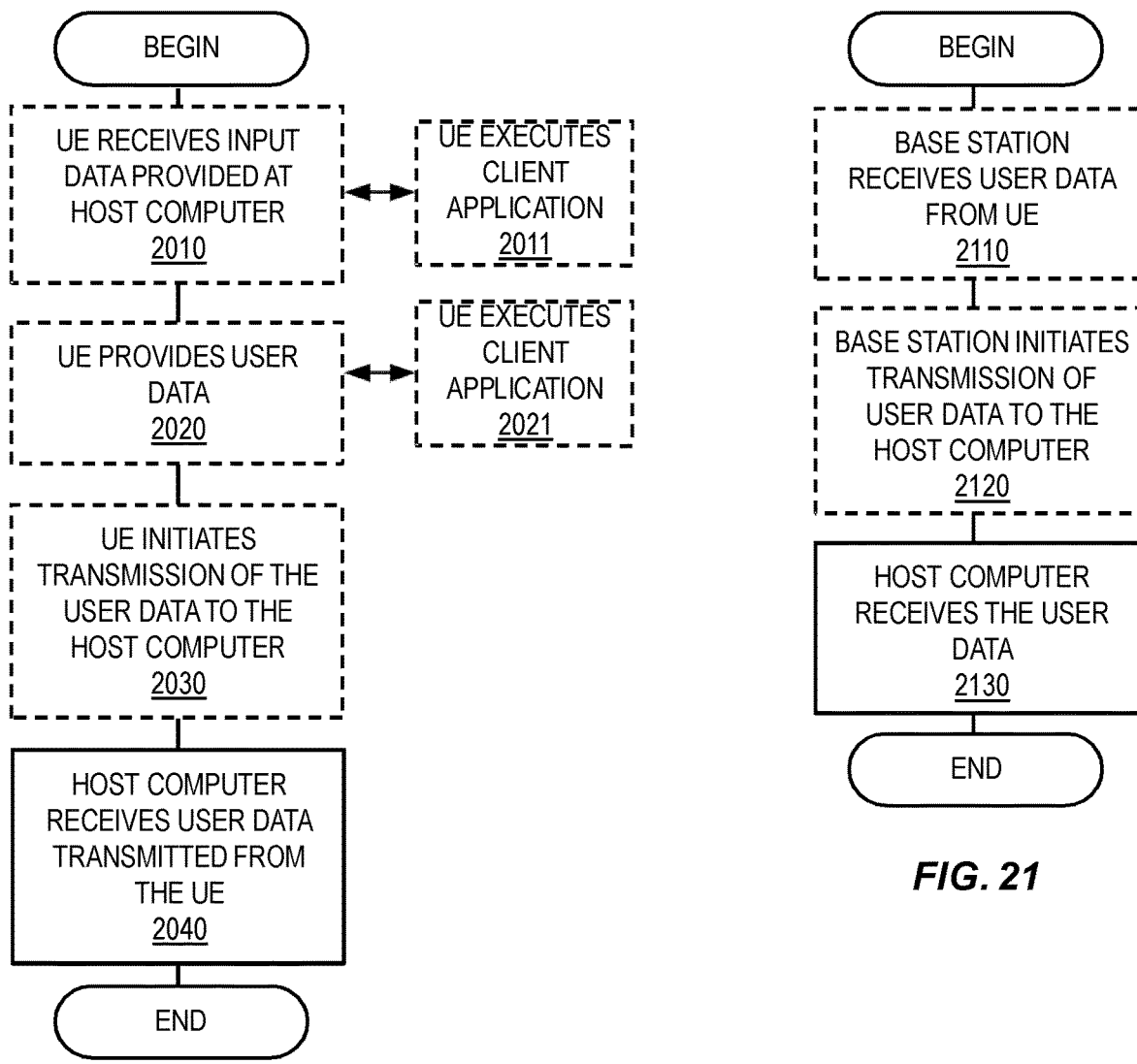

FIG. 20 is a flowchart illustrating an exemplary method and/or procedure implemented in a communication system, in accordance with one embodiment. The communication system includes a host computer, a base station and a UE which can be those described with reference to FIGS. 16 and 17. For simplicity of the present disclosure, only drawing references to FIG. 20 will be included in this section. In step 2010 (which can be optional), the UE receives input data provided by the host computer. Additionally or alternatively, in step 2020, the UE provides user data. In substep 2021 (which can be optional) of step 2020, the UE provides the user data by executing a client application. In substep 2011 (which can be optional) of step 2010, the UE executes a client application which provides the user data in reaction to the received input data provided by the host computer. In providing the user data, the executed client application can further consider user input received from the user. Regardless of the specific manner in which the user data was provided, the UE initiates, in substep 2030 (which can be optional), transmission of the user data to the host computer. In step 2040 of the method, the host computer receives the user data transmitted from the UE, in accordance with the teachings of the embodiments described throughout this disclosure.

FIG. 21 is a flowchart illustrating an exemplary method and/or procedure implemented in a communication system, in accordance with one embodiment. The communication system includes a host computer, a base station and a UE which can be those described with reference to FIGS. 16 and 17. For simplicity of the present disclosure, only drawing references to FIG. 21 will be included in this section. In step 2110 (which can be optional), in accordance with the teachings of the embodiments described throughout this disclosure, the base station receives user data from the UE. In step 2120 (which can be optional), the base station initiates transmission of the received user data to the host computer. In step 2130 (which can be optional), the host computer receives the user data carried in the transmission initiated by the base station.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

The term "network node" used herein can be any kind of network node in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment.

As used herein, a "radio access node" (or "radio network node") can be any node in a radio access network (RAN) that operates to wirelessly transmit and/or receive signals. Some examples of radio access nodes include, but are not limited to, a base station (e.g., a New Radio (NR) base station (gNB) in a 3GPP Fifth Generation (5G) NR network or an eNB in a 3GPP LTE network), a high-power or macro base station, a low-power base station (e.g., a micro base station, a pico base station, a home eNB, or the like), a relay node, access point (AP), radio AP, remote radio unit (RRU), remote radio head (RRH), a multi-standard BS (e.g., MSR BS), multi-cell/multicast coordination entity (MCE), base transceiver station (BTS), base station controller (BSC), network controller, NodeB (NB), etc. Such terms can also be used to reference to components of a node, such as a gNB-CU and/or a gNB-DU.

As used herein, the term "radio node" can refer to a wireless device (WD) or a radio network node.

As used herein, a "core network node" can be any type of node in a core network. Some examples of a core network node include, e.g., a Mobility Management Entity (MME), a Packet Data Network Gateway (P-GW), a Service Capability Exposure Function (SCEF), Access and Mobility Management Function (AMF), User Plane Function (UPF), Home Subscriber Server (HSS), etc.

As used herein, a "network node" is any node that is part of a radio access network (e.g., a "radio network node" or "radio access node") or a core network (e.g., a "core network node") of a wireless communication system, such as a cellular communications network/system.

In some embodiments, the non-limiting terms "wireless device" (WD) or "user equipment" (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine-to-machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

In some embodiments, the term "slot" is used to indicate a radio resource; however, it should be understood that the techniques described herein may advantageously be used with other types of radio resources, such as any type of physical resource or radio resource expressed in terms of length of time. Examples of time resources are: symbol, time slot, minislot, subframe, radio frame, transmission time interval (TTI), interleaving time, a time resource number, etc.

In some embodiments, a transmitter (e.g., network node) and a receiver (e.g., WD) previously agrees on rule(s) for determining for which resources the transmitter and receiver will arrange one or more physical channels during transmission of the resources, and this rule may, in some embodiments, be referred to as "mapping." In other embodiments, the term "mapping" may have other meanings.

As used herein, a "channel" can be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel (e.g., PDSCH), in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction.

Furthermore, although the term "cell" is used herein, it should be understood that (particularly with respect to 5G NR) beams may be used instead of cells and, as such, concepts described herein apply equally to both cells and beams.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the concepts, principles, and/or embodiments described herein.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The invention claimed is:

1. A method for provisioning subscription data for a plurality of subscribers forming a group of subscribers to one or more network functions (NFs) in a communication network, the method comprising:
   storing group data related to the group of subscribers in association with at least a first group identifier (GID) but not in association with individual subscription data for each respective subscriber of the group of subscribers;
   sending to the one or more NFs, the group data for the group of subscribers and the first GID associated with the group data without regard to a registration status of group members in the one or more NFs; and
   sending to a particular NF of the one or more NFs, the first GID and individual subscription data for a particular subscriber of the group of subscribers, the individual subscription data for the particular subscriber being (i) separate from the group data and (ii) not being associated with the first GID for the group data.

2. The method of claim 1, further comprising receiving from a further NF, the first GID and identifiers for members of the group of subscribers identified by the first GID.

3. The method of claim 2, further comprising receiving from the further NF, the first GID and the group data associated with the group of subscribers.

4. The method of claim 1, further comprising receiving from a further NF, the first GID and the group data associated with the group of subscribers.

5. The method of claim 1, further comprising receiving from the one or more NFs, respective notification requests related to the first GID, the group data and the first GID being sent in response to the notification requests.

6. The method of claim 1, further comprising receiving from the particular NF, a request for the individual subscription data for the particular subscriber, the first GID and the individual subscription data being sent in response to the request for the individual subscription data.

7. The method of claim 1, wherein the group data is stored further in association with a second GID.

8. The method of claim 7, further comprising:
   receiving, from an application function (AF) a request for the group data, the request including the second GID; and
   sending, to the AF, the second GID and the group data.

9. The method of claim 7, further comprising:
   receiving from an application function (AF) the second GID and updated group data associated with the group of subscribers; and
   storing the updated group data in association with the first and second GIDs but not in association with the individual subscription data for each respective subscriber of the group of subscribers; and
   sending to the one or more NFs, the updated group data and the first GID.

10. The method of claim 9, wherein the updated group data and the first GID are sent in response to respective notification requests from the one or more NFs.

11. The method of claim 1, wherein:
    the communication network is a 5G core (5GC) network;
    the method is performed by a unified data management (UDM) function; and
    the one or more NFs include any of the following:
    Access and Mobility Management Function (AMF);
    Session Management Function (SMF);
    User Plane Function (UPF);
    Short Message Service (SMS) Function (SMSF); and
    Policy Control Function (PCF).

12. A method for provisioning subscription data for a plurality of subscribers forming a group of subscribers to a network function (NF) in a communication network, the method comprising:
    receiving from a data management function of the communication network, group data for the group of subscribers and a first group identifier (GID) associated with the group data without regard to a registration status of group members in the NF;
    storing the group data in association with the first GID but not in association with individual subscription data for each respective subscriber of the group of subscribers;
    receiving from the data management function, the first GID and individual subscription data for a particular subscriber of the group of subscribers, the individual subscription data for the particular subscriber being (i) separate from the group data and (ii) not being associated with the first GID for the group data; and
    creating a context, for the particular subscriber, including the individual subscription data and a reference to the stored group data.

13. The method of claim 12, further comprising sending to the data management function, a notification request related to the first GID, the group data and the first GID being received in response to the notification request.

14. The method of claim 12, further comprising:
    receiving from the data management function, the first GID and updated group data related to the group of subscribers; and
    based on the received updated group data, updating the stored group data associated with the first GID.

15. The method of claim 14, wherein the context for the particular subscriber references the updated stored group data.

16. The method of claim 14, wherein the first GID and the updated group data are received in response to a notification request related to the first GID.

17. The method of claim 12, further comprising:
    receiving a request to register the particular subscriber in the NF; and
    sending to the data management function, a request for the individual subscription data for the particular subscriber, the first GID and the individual subscription data is received in response to the request for the individual subscription data.

18. The method of claim 12, wherein:
    the communication network is a 5G core (5GC) network;
    the data management function is a unified data management (UDM) function in the 5GC; and
    the method is performed by the NF internal to the 5GC.

19. The method of claim 18, wherein the NF is one of the following:
    Access and Mobility Management Function (AMF);
    Session Management Function (SMF);
    User Plane Function (UPF);
    Short Message Service (SMS) Function (SMSF); and
    Policy Control Function (PCF).

20. A unified data management (UDM) function in a communications network, the UDM function comprising:
    a storage repository configured to store group data and individual subscription data;

a plurality of group data management (GDM) services configured to communicate with a plurality of other network functions (NFs) in the communications network; and processing circuitry operably coupled to the storage repository and the GDM services, the processing circuitry being configured to provision subscription data for a group of subscribers to one or more NFs in the communication network, by:

storing group data related to the group of subscribers in association with at least a first group identifier (GID) but not in association with individual subscription data for each respective subscriber of the group of subscribers;

sending to the one or more NFs, the group data for the group of subscribers and a first GID without regard to a registration status of group members in the one or more NFs; and sending to a particular NF of the one or more NFs, the first GID and individual subscription data for a particular subscriber of the group of subscribers, the individual subscription data for the particular subscriber being (i) separate from the group data and (ii) not being associated with the first GID for the group data.

* * * * *